United States Patent
Aruga

(10) Patent No.: US 10,627,626 B2
(45) Date of Patent: Apr. 21, 2020

(54) DISPLAY DEVICE, RECEPTION DEVICE, AND METHOD OF CONTROLLING RECEPTION DEVICE

(71) Applicant: SEIKO EPSON CORPORATION, Tokyo (JP)

(72) Inventor: Naoto Aruga, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/710,056

(22) Filed: Sep. 20, 2017

(65) Prior Publication Data

US 2018/0088339 A1 Mar. 29, 2018

(30) Foreign Application Priority Data

Sep. 29, 2016 (JP) ................................. 2016-190611
May 30, 2017 (JP) ................................. 2017-106489

(51) Int. Cl.
| | |
|---|---|
| *G09G 3/3208* | (2016.01) |
| *G01S 1/68* | (2006.01) |
| *G09G 3/00* | (2006.01) |
| *G02B 27/01* | (2006.01) |
| *G01S 19/53* | (2010.01) |
| *G01S 5/02* | (2010.01) |
| *G01S 19/48* | (2010.01) |

(52) U.S. Cl.
CPC ........ *G02B 27/0172* (2013.01); *G01S 5/0263* (2013.01); *G01S 19/48* (2013.01); *G01S 19/53* (2013.01); *G01S 1/68* (2013.01); *G02B 2027/014* (2013.01); *G02B 2027/0138* (2013.01); *G02B 2027/0141* (2013.01); *G02B 2027/0178* (2013.01); *G09G 3/003* (2013.01); *G09G 3/3208* (2013.01); *G09G 2370/025* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 8,135,344 B2 | 3/2012 | Krueger et al. | |
| 9,288,759 B2 | 3/2016 | Kerai et al. | |
| 2009/0102642 A1* | 4/2009 | Huseth | G01S 5/14 340/539.13 |
| 2013/0127980 A1* | 5/2013 | Haddick | G06F 3/013 348/14.08 |
| 2014/0168392 A1* | 6/2014 | Kang | H04W 4/80 348/56 |

(Continued)

FOREIGN PATENT DOCUMENTS

| | | |
|---|---|---|
| JP | 2012-186522 A | 9/2012 |
| JP | 2013-042544 A | 2/2013 |

(Continued)

*Primary Examiner* — Andre L Matthews
(74) *Attorney, Agent, or Firm* — Oliff PLC

(57) ABSTRACT

An HMD includes a beacon reception unit that receives a beacon signal and a control unit that controls a reception period of the beacon reception unit and intermittently receives a beacon signal. The control unit selects the beacon signal based on a reception strength of the beacon signal received by the beacon reception unit and changes a reception period of the beacon signal reception unit in accordance with a transmission timing of the selected beacon signal.

19 Claims, 17 Drawing Sheets

(56) References Cited

U.S. PATENT DOCUMENTS

| | | |
|---|---|---|
| 2015/0172906 A1 | 6/2015 | Terazaki et al. |
| 2015/0327022 A1* | 11/2015 | Lin .................... G01S 5/02 |
| | | 455/456.1 |
| 2016/0019603 A1* | 1/2016 | Reynolds ........... G06Q 30/0277 |
| | | 705/14.73 |

FOREIGN PATENT DOCUMENTS

| | | |
|---|---|---|
| JP | 5721713 B2 | 5/2015 |
| JP | 2015-119296 A | 6/2015 |
| JP | 2015-220470 A | 12/2015 |
| WO | 2011/010181 A1 | 1/2011 |

\* cited by examiner

1A

DISPLAY DEVICE, RECEPTION DEVICE, AND METHOD OF CONTROLLING RECEPTION DEVICE

BACKGROUND

1. Technical Field

The present invention relates to a display device, a reception device, a program, and a method of controlling the reception device.

2. Related Art

In the related art, there are known reception devices that receive beacon signals through intermittent reception (for example, see JP-A-2015-220470).

A reception device disclosed in JP-A-2015-220470 changes a duty cycle of a reception unit based on a detection signal indicating that a state of the reception unit or a surrounding state of the reception unit is changed. The duty cycle indicates a reception period of a signal at a reception interval of the signal.

Incidentally, when beacon signals are received through intermittent reception, reception of the beacon signals fails in some cases. In particular, when beacon signals transmitted from a plurality of transmission sources are received, reception timings of the reception device do not match transmission timings of the beacon signals and the beacon signals may not be received in some cases. To reduce a possibility of reception of the beacon signals failing, a length of a duration in which the reception device receives beacon signals may be lengthened, but power consumption of the reception device may increase.

SUMMARY

An advantage of some aspects of the invention is to reduce a possibility of reception of beacon signals failing while suppressing power consumption necessary for reception.

An aspect of the invention is directed to a display device that is a transmissive display device worn on a head of a user and transmits an outside scenery so that the user views the outside scenery. The display device includes: a reception unit that receives beacon signals; and a control unit that controls a reception period of the reception unit and intermittently receives the beacon signal. The control unit changes the reception period of the reception unit to correspond to a reception state of the beacon signal received by the reception unit.

According to the aspect of the invention, the reception period of the reception unit intermittently receiving the beacon signal is changed to correspond to a reception state in which the reception unit receives the beacon signal. Therefore, it is possible to achieve an improvement in the reception state of the beacon signal by changing the reception period and it is possible to increase a probability that the beacon signal is captured. Thus, it is possible to reduce power consumption necessary for reception of the reception device.

In the aspect of the invention, the control unit may select the beacon signal based on a reception strength of the beacon signal received by the reception unit and change the reception period of the reception unit in accordance with a transmission timing of the selected beacon signal.

According to the aspect of the invention with this configuration, the reception period of the reception unit is changed in accordance with the transmission timing of the beacon signal selected based on the reception strength. Therefore, it is possible to increase the probability that the selected beacon signals are captured and it is possible to reduce the power consumption necessary to receive the beacon signals.

In the aspect of the invention, the control unit may change the reception period of the reception unit based on information included in the beacon signal received by the reception unit or information indicated by the beacon signal.

According to the aspect of the invention with this configuration, the reception period of the beacon signal is changed based on the information included in the beacon signal received by the reception unit or the information indicated by the beacon signal. Thus, it is possible to change the beacon signal based on content of information transmitted as the beacon signal. For example, it is possible to optimize the reception period to correspond to importance of information.

Another aspect of the invention is directed to a reception device including: a reception unit that receives beacon signals; and a control unit that controls a reception period of the reception unit and intermittently receives the beacon signal. The control unit changes the reception period of the reception unit to correspond to a reception state of the beacon signal received by the reception unit.

According to the aspect of the invention, the reception period of the reception unit intermittently receiving the beacon signal is changed in accordance with a reception state in which the reception unit receives the beacon signal. Therefore, it is possible to achieve an improvement in the reception state of the beacon signal by changing the reception period and it is possible to increase a probability that the beacon signal is captured. Thus, it is possible to reduce power consumption necessary for reception of the reception device.

In the aspect of the invention, the control unit may select the beacon signal based on a reception strength of the beacon signal received by the reception unit and change the reception period of the reception unit in accordance with a transmission timing of the selected beacon signal.

According to the aspect of the invention with this configuration, the reception period of the reception unit is changed in accordance with the transmission timing of the beacon signal selected based on the reception strength. Therefore, it is possible to increase the probability that the selected beacon signals are captured and it is possible to reduce the power consumption necessary to receive the beacon signals.

In the aspect of the invention, the control unit may shift the reception period of the reception unit in accordance with the transmission timing of the selected beacon signal.

According to the aspect of the invention with this configuration, since the reception period of the reception unit is shifted in accordance with the transmission timing of the beacon signal, the reception period of the reception unit can be changed in accordance with the transmission timing of the selected beacon signal, the reception unit can be caused to receive the selected beacon signal.

In the aspect of the invention, the control unit may set a first duration in which the reception unit is caused to perform an operation of receiving the beacon signal and a second duration in which the reception unit is caused not to perform the operation of receiving the beacon signal. The control unit may change a duty ratio between the first and second durations at the reception period in accordance with the transmission timing of the selected beacon signal.

According to the aspect of the invention with this configuration, since the duty ratio between the first and second durations at the reception period is changed in accordance with the transmission timing of the beacon signal, the duty ratio between a reception duration and a non-reception duration can be changed and the reception unit can be caused to receive the selected beacon signal.

In the aspect of the invention, the control unit may set a first duration in which the reception unit is caused to perform an operation of receiving the beacon signal and a second duration in which the reception unit is caused not to perform the operation of receiving the beacon signal. The control unit may change a length of the first duration in accordance with the transmission timing of the selected beacon signal.

According to the aspect of the invention with this configuration, since the length of the first duration is changed in accordance with the transmission timing of the beacon signal, the length of the reception duration can be changed and the reception unit can be caused to receive the selected beacon signal.

In the aspect of the invention, when the reception unit receives the plurality of beacon signals, the control unit may select a preset number of beacon signals based on the reception strengths of the plurality of received beacon signals and change the reception period of the reception unit in accordance with the transmission timing of the selected beacon signal.

According to the aspect of the invention with this configuration, when the plurality of beacon signals are received, the beacon signal is selected based on the reception strength and the reception period of the reception unit is changed in accordance with the transmission timing of the selected beacon signal. Therefore, the reception unit can be caused to receive the beacon signal selected based on the reception strength.

In the aspect of the invention, the control unit may acquire information regarding transmission sources of the beacon signals from the plurality of beacon signals and select a preset number of beacon signals based on the reception strengths of the plurality of received beacon signals and the information regarding the transmission sources of the plurality of beacon signals.

According to the aspect of the invention with this configuration, the reception unit can be caused to receive the beacon signal selected based on the reception strength of the beacon signal and the information regarding the transmission source of the beacon signal. For example, by using the positional information of the transmission source of the beacon signal as the information regarding the transmission source, the reception unit can be caused to receive the beacon signal with a large reception strength transmitted from the transmission source located near the reception device.

In the aspect of the invention, when the selected beacon signals include the beacon signal unreceivable at the changed reception period, the control unit may select the beacon signal to be excluded from the selected beacon signals based on the reception strengths and reset the reception period in accordance with the transmission timings of the beacon signals from which the selected beacon signal to be excluded is excluded.

According to the aspect of the invention with this configuration, there is a beacon signal which is unreceivable at the set reception period, the beacon signal received based on the reception strength is reselected and the reception period is reset so that the selected beacon signal is receivable. Therefore, it is possible to reduce a possibility of the reception of the selected beacon signal failing.

In the aspect of the invention, the control unit may estimate a position of the reception device based on the reception strength of the beacon signal received by the reception unit.

According to the aspect of the invention with this configuration, since the position of the reception device is estimated based on the reception strength of the beacon signal received by the reception unit, the position of the reception device can be estimated with high precision.

In the aspect of the invention, the reception device may further include a storage unit that stores positional information indicating a position of a beacon device transmitting the beacon signal in association with identification information of the beacon device. The control unit may acquire the identification information from each of the plurality of beacon signals received by the reception unit and estimate the position of the reception device based on the reception strengths of the plurality of beacon signals and the pieces of positional information regarding the beacon devices, which are the transmission sources of the plurality of beacon signals, which are acquired from the storage unit.

According to the aspect of the invention with this configuration, the position of the reception device is estimated based on the reception strengths of the plurality of received beacon signals and the positional information of the beacon devices of the transmission sources of the plurality of beacon signals. Accordingly, it is possible to improve estimation precision of the position of the reception device.

In the aspect of the invention, the control unit may select the beacon signals by comparing the reception strengths of the plurality of received beacon signals to a threshold, estimate the position of the reception device through 3-point positioning when the number of selected beacon signals is 3, estimate the position of the reception device through 4-point positioning when the number of selected beacon signals is 4 or more, and reset the reception period when the number of selected beacon signals is less than 3.

According to the aspect of the invention with this configuration, a positioning method of estimating the position of the reception device is changed in accordance with the number of selected beacon signals. Accordingly, a positioning process corresponding to the number of received beacon signals can be performed. Therefore, when the number of received beacon signals is large, it is possible to improve the estimation precision of the position of the reception device. When the number of received beacon signals is small, the reception period can be reset and the reception unit can be caused to receive the beacon signal again.

In the aspect of the invention, the reception device may further include at least one of an acceleration sensor, a gyro sensor, and a magnetic sensor. The control unit may correct the estimated position of the reception device based on a detection value detected by at least the one of the acceleration sensor, the gyro sensor, and the magnetic sensor.

According to the aspect of the invention with this configuration, since the estimated position of the reception device is corrected based on the detection value, it is possible to further improve the estimation precision of the position of the reception device.

In the aspect of the invention, the beacon signals received by the reception unit may be radio beacon signals or signals based on a Bluetooth (registered trademark) Low Energy communication standard.

According to the aspect of the invention with this configuration, since the radio beacon signal or the signal based on the Bluetooth Low Energy communication standard is used as the beacon signal, the configuration of the reception device can be simple. Thus, it is possible to reduce power consumption of the reception device.

In the aspect of the invention, the control unit may change the reception period of the reception unit based on information included in the beacon signal received by the reception unit or information indicated by the beacon signal.

According to the aspect of the invention with this configuration, the reception period of the beacon signal is changed based on the information included in the beacon signal received by the reception unit or the information indicated by the beacon signal. Thus, it is possible to change the reception period of the beacon signal based on the content of the information transmitted as the beacon signal. For example, it is possible to optimize the reception period to correspond to importance of information. Thus, it is possible to increase the probability that the beacon signals are captured based on the information indicated by the beacon signal and to receive the beacon signals more reliably.

In the aspect of the invention, when a first duration in which the reception unit is caused to perform an operation of receiving the beacon signal and a second duration in which the reception unit is caused not to perform the operation of receiving the beacon signal are set, the control unit may change a duty ratio between the first and second durations, a length of the first duration, or the reception period of the reception unit.

According to the aspect of the invention with this configuration, the reception operation of the reception unit can be adjusted based on the information included in the beacon signal received by the reception unit or the information indicated by the beacon signal. Thus, it is possible to increase the probability that the beacon signals are captured based on the information indicated by the beacon signal and to receive the beacon signals more reliably.

In the aspect of the invention, based on information included in the beacon signal received by the reception unit or information indicated by the beacon signal, the control unit may change the duty ratio between the first and second durations, the length of the first duration, or the reception period of the reception unit so that beacon signals other than the beacon signals received by the reception unit are received.

According to the aspect of the invention with this configuration, the reception operation of the reception unit can be adjusted finely based on the information indicated by the beacon signal. Thus, it is possible to increase the probability that the beacon signals are captured and to receive the beacon signals more reliably.

Still another aspect of the invention is directed to a computer-executable program controlling a reception device that controls a reception period of a reception unit receiving a beacon signal and intermittently receives the beacon signal. The program causes a computer to perform a procedure of changing the reception period of the reception unit to correspond to a reception state of the beacon signal received by the reception unit.

According to the aspect of the invention, the reception period of the reception unit intermittently receiving the beacon signal is changed in accordance with a reception state in which the reception unit receives the beacon signal. Therefore, it is possible to achieve an improvement in the reception state of the beacon signals by changing the reception period and it is possible to increase a probability that the beacon signals are captured. Thus, it is possible to reduce power consumption necessary for reception of the reception device.

In the aspect of the invention, the program may cause the computer to perform: a procedure of detecting a reception strength as the reception state of the beacon signal received by the reception unit; a procedure of selecting the beacon signal based on the detected reception strength; and a procedure of changing the reception period of the reception unit in accordance with a transmission timing of the selected beacon signal.

According to the aspect of the invention with this configuration, the reception period of the reception unit is changed in accordance with the transmission timing of the beacon signal selected based on the reception strength. Therefore, it is possible to increase the probability that the selected beacon signals are captured and it is possible to reduce the power consumption necessary to receive the beacon signals.

Still another aspect of the invention is directed to a method of controlling a reception device that controls a reception period of a reception unit receiving a beacon signal and intermittently receives the beacon signal. The method includes changing the reception period of the reception unit to correspond to a reception state of the beacon signal received by the reception unit.

According to the aspect of the invention, the reception period of the reception unit intermittently receiving the beacon signal is changed in accordance with a reception state in which the reception unit receives the beacon signal. Therefore, it is possible to achieve an improvement in the reception state of the beacon signal by changing the reception period and it is possible to increase a probability that the beacon signal is captured. Thus, it is possible to reduce power consumption necessary for reception of the reception device.

In the aspect of the invention, the method of controlling the reception device may further include: detecting a reception strength as the reception state of the beacon signal received by the reception unit; selecting the beacon signal based on the detected reception strength; and changing the reception period of the reception unit in accordance with a transmission timing of the selected beacon signal.

According to the aspect of the invention with this configuration, the reception period of the reception unit is changed in accordance with the transmission timing of the beacon signal selected based on the reception strength. Therefore, it is possible to increase the probability that the selected beacon signals are captured and it is possible to reduce the power consumption necessary to receive the beacon signals.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
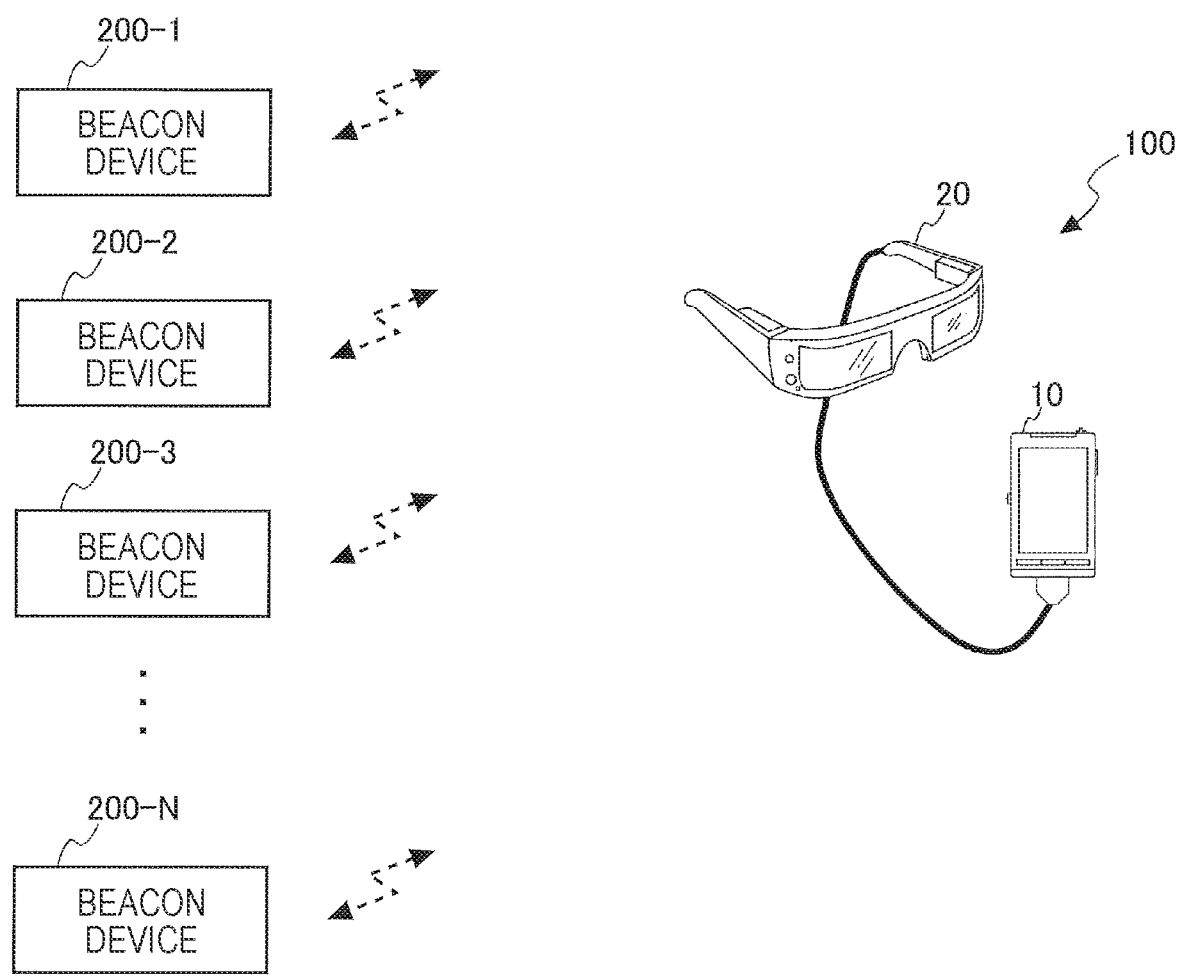
FIG. 1 is a diagram illustrating a configuration of a system including an HMD.

FIG. 1 is a diagram illustrating a schematic configuration of a system 1 including a head-mounted display (HMD) 100 and a plurality of beacon devices 200 to which the invention is applied. The HMD 100 is equivalent to a "reception device" and a "display device" according to the invention.

The HMD 100 receives GPS signals transmitted from Global Positioning System (GPS) satellites and performs a positioning process based on the received GPS signals to estimate a current position of the HMD 100. The positioning process performed based on the GPS signals is referred to as GPS positioning. In a place in which beacon signals can be received, the HMD 100 performs a positioning process based on beacon signals to estimate a current position of the HMD 100. The positioning process performed based on the beacon signals is referred to as beacon positioning.

The plurality of beacon devices 200 are installed, for example, in places in which it is difficult to receive GPS signals or places in which precision of GPS positioning is low. The beacon devices 200 are disposed inside structures, for example, in indoor or passage ceilings or under roofs. The structures are not limited to buildings and include various large and small structures such as homes, apartments, mansions, stores, shopping centers, amusement facilities. The beacon devices 200 can also be installed in constructions such as station platforms, tunnel walls, and roads.

The beacon devices 200 periodically transmit beacon signals to the surrounding beacon devices 200. For example, Bluetooth Low Energy (BLE) is applied to a communication standard used for communication between the beacon devices 200 and the HMD 100.

In the embodiment, the beacon devices 200 conforming with the BLE standard have been described as examples, but a communication standard of the beacon device 200 is not limited to BLE. For example, a wireless personal area network (PAN) such as ZigBee (registered trademark) or radio beacons can also be used.

The beacon device 200 can be configured to use a primary battery, a secondary battery, a fuel cell, or a commercial alternating-current power supply as a power supply. The beacon device 200 may be, for example, a self-power generation type wireless transmission device using an EnOcean (registered trademark) technology.

A beacon signal transmitted by the beacon device 200 includes any information, but preferably includes information by which the beacon device 200 transmitting the beacon signal can be identified or specified. An example of such a kind of information includes a beacon identification (ID) by which the beacon device 200 of a transmission source is identified. The beacon ID is identification information unique to the beacon device 200. For example, the beacon devices 200-1 to 200-N in the system 1 have different (unique) IDs assigned in advance and transmit beacon signals including the IDs.

Figure 2:
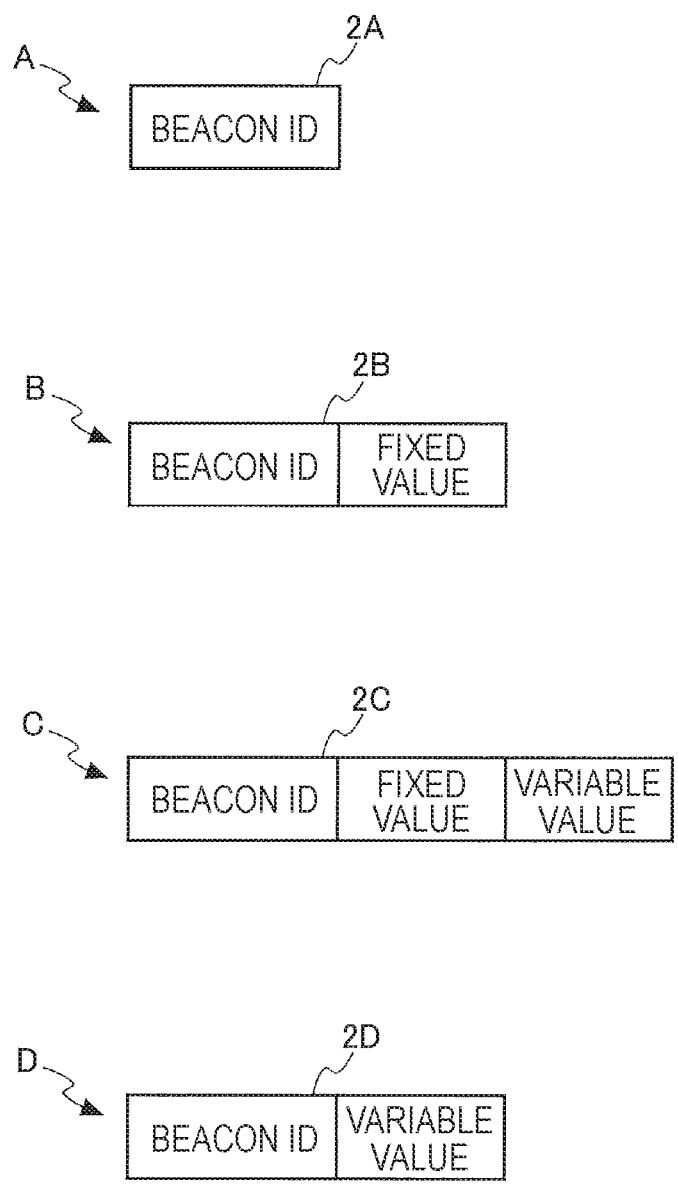
FIG. 2 is a schematic diagram illustrating configurations of beacon signals.

FIG. 2 is a schematic diagram illustrating configurations of beacon signals transmitted and received in the system 1.

Any mode of the beacon signal transmitted by the beacon device 200 can be used. For example, the mode can be selected among modes A to C illustrated in FIG. 2. Reference numerals A, B, C, and D in FIG. 2 indicate configurations of beacon signals 2A, 2B, 2C, and 2D which are examples of the beacon signals.

The beacon signal 2A is an example of a signal including only a beacon ID. In other words, the beacon signal 2A is an example of a beacon signal which is a signal obtained by encoding the beacon ID.

The beacon signals 2B, 2C, and 2D are examples of the beacon signals including information other than the beacon ID (hereinafter referred to as additional information). The additional information may be a fixed value set in advance in the beacon device 200. Specifically, information indicating types, operations, setting, information at the time of manufacturing, dates of operation start of the beacon devices 200 or other attributions may be used as the additional information, or information indicating the positions of the beacon devices 200 may be used.

The additional information may be a variable value including information which can be changed by the beacon device 200. As a specific example of the variable value, a time at which a beacon signal is transmitted may be included as a variable value in the beacon signal when the beacon device 200 has a function of representing a time. A measured value or a detected value may be a variable value of the beacon signal when the beacon device 200 has a function of performing measurement or detection. That is, a beacon signal including a measured value may be transmitted as the additional information.

The beacon signal 2B in FIG. 2 has a frame configuration that includes a field for storing the beacon ID and a field for storing a fixed value. The beacon signal 2C has a frame configuration that includes a field for storing a beacon ID, a field for storing a fixed value, and a field for storing a variable value. The beacon signal 2D has a frame configuration that includes a field for storing a beacon ID and a field for storing a variable value. The beacon device 200 may perform a process of acquiring a variable value and generating a frame (a packet) including the acquired variable value when the beacon device 200 transmits the beacon signal 2C or 2D.

The configurations of the beacon signals transmitted by the beacon devices 200 are not limited to the beacon signals 2A, 2B, 2C, and 2D. For example, a frame configuration that includes a plurality of fields for storing a fixed value or a variable value may be used. A frame configuration that includes a plurality of fixed values or variable values in one field may be used.

The beacon device 200 transmits a beacon signal during each preset constant period (hereinafter referred to as a transmission period). At one period in which the beacon device 200 transmits the beacon signal, a duration at which the beacon device 200 transmits a beacon signal is referred to as a transmission duration (transmission timing) and a duration in which no beacon signal is transmitted is referred to as a non-transmission duration. The beacon device 200 transmits a beacon signal around the beacon device 200 during the transmission duration and stops transmitting the beacon signal during the non-transmission duration. When the non-transmission duration has elapsed, the transmission duration starts. Then, the beacon device 200 resumes the transmission of the beacon signal.

FIG. 1 illustrates N (where N is any natural number) beacon devices 200, the beacon devices 200-1 to 200-N.

The HMD 100 receives the beacon signals from at least three beacon devices 200 and estimates distances between the beacon devices 200 of transmission sources of the beacon signals and the HMD 100 based on signal strengths of the received beacon signals. Then, the HMD 100 estimates a current position of the HMD 100 through 3-point positioning or 4-point positioning based on the estimated distances between at least the three beacon devices 200 and the HMD 100. Therefore, in order for the HMD 100 to estimate the current position based on the beacon signals, it is necessary to receive the beacon signals from at least the three beacon devices 200 in a state in which the HMD 100 is stopped. Accordingly, it is necessary to dispose the beacon devices 200 so that arriving ranges of the beacon signals transmitted by the plurality of beacon devices 200 partially overlap each other and to set transmission power of the beacon devices 200. When the plurality of beacon devices 200 are disposed nearby, the transmission durations are adjusted so that transmission timings of the beacon signals do not match. The reason for adjusting the transmission durations is to prevent an increase in a probability that reception of some of the beacon signals fails or acquisition of information superimposed on the beacon signals fails when the HMD 100 simultaneously receives the beacon signals transmitted from the plurality of beacon devices 200.

In the embodiment, a configuration will be exemplified in which the plurality of beacon devices 200-1 to 200-N illustrated in FIG. 1 transmit the beacon signals with the same frequency band in conformity to a common communication scheme. The same frequency band refers to a band with a preset width and is not limited to one specific frequency. In this configuration, the HMD 100 can receive the beacon signals transmitted by the beacon devices 200-1 to 200-N by receiving radio signals with a predetermined frequency band.

Figure 3:
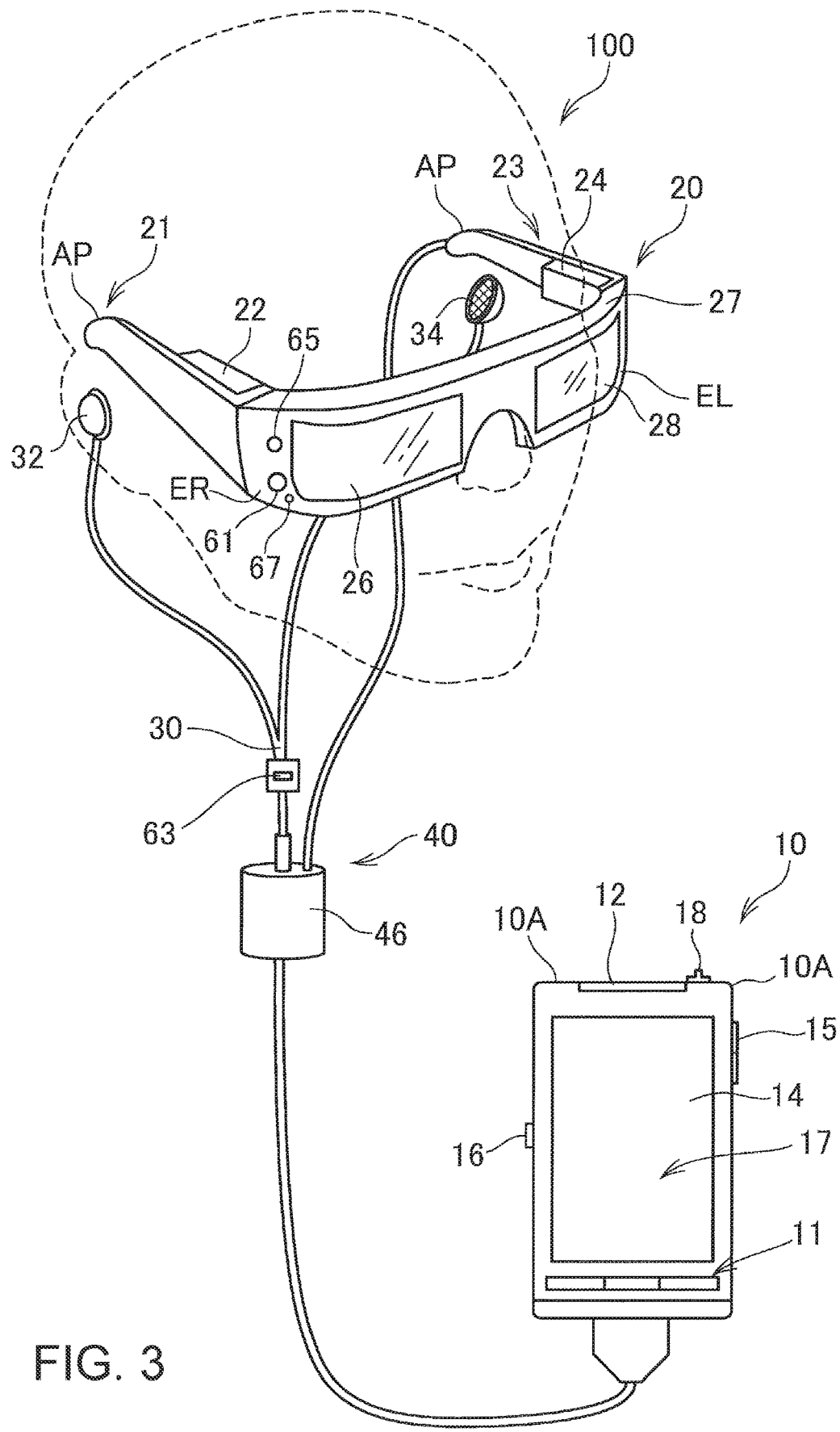
FIG. 3 is a diagram illustrating the exterior of the HMD.

FIG. 3 is a diagram illustrating the exterior of the HMD 100.

The HMD 100 is a display device that includes an image display unit 20 (a display unit) that allows a virtual image to view a user in a state in which the HMD 100 is worn on the head of the user and a control device 10 that controls the image display unit 20. As illustrated in FIG. 3, the control device 10 includes a flat box-shaped case 10A (which can also be said to be a casing or a body).

The case 10A includes units of a button 11, an LED indicator 12, a track pad 14, upper and lower keys 15, a changeover switch 16, and a power switch 18. The button 11, the track pad 14, the upper and lower keys 15, the changeover switch 16, and the power switch 18 are operation units to be operated by the user. The LED indicator 12 functions as, for example, a sub-display unit that indicates an operation state of the HMD 100. The user can operate the HMD 100 by operating the operation units. The control device 10 functions as a controller of the HMD 100 (display device).

The image display unit 20 is a mounted body that is worn on the head of the user and has a glasses shape in the embodiment. The image display unit 20 includes a body that has a right hold unit 21, a left hold unit 23, a front frame 27 and includes a right display unit 22, a left display unit 24, a right light-guiding plate 26, and a left light-guiding plate 28.

The right hold unit 21 and the left hold unit 23 extend backward from both end portions of the front frame 27 and hold the image display unit 20 on the head of the user, like a temple of glasses. Here, of both the end portions of the front frame 27, the end portion located on the right side of the user is referred to as an end portion ER and the end portion located on the left side of the user is referred to as an end portion EL in a state when the image display unit 20 is worn. The right hold unit 21 is installed to extend from the end portion ER of the front frame 27 to a position corresponding to a right head part of the user in the state in which the image display unit 20 is worn. The left hold unit 23 is installed to extend from the end portion EL to a position corresponding to a left head part of the user in the state in which the image display unit 20 is worn.

The right light-guiding plate 26 and the left light-guiding plate 28 are installed in the front frame 27. The right light-guiding plate 26 is located in front of the right eye of the user so that an image can be viewed by the right eye in the state in which the image display unit 20 is worn. The left light-guiding plate 28 is located in front of the left eye of the user so that an image can be viewed by the left eye in the state in which the image display unit 20 is worn.

The front frame 27 has a shape in which one end of the right light-guiding plate 26 is connected to one end of the left light-guiding plate 28. The connection position corresponds to the glabellas of the user in the state in which the user wears the image display unit 20. In the front frame 27, a nose portion coming into contact with the nose of the user may be installed at the connection position of the right light-guiding plate 26 and the left light-guiding plate 28 in the state in which the image display unit 20 is worn. In this case, the image display unit 20 can be held on the head of the user by the nose portion and the right hold unit 21 and the left hold unit 23. A belt (not illustrated) in contact with the back of the head of the user in the state in which the image display unit 20 is worn may be connected to the right hold unit 21 and the left hold unit 23. In this case, the image display unit 20 can be held on the head of the user by the belt.

The right display unit 22 realizes display of an image by the right light-guiding plate 26. The right display unit 22 is installed in the right hold unit 21 and is located near the right head part of the user in the worn state. The left display unit 24 realizes display of an image by the left light-guiding plate 28. The left display unit 24 is installed in the left hold unit 23 and is located near the left head part of the user in the worn state.

The right light-guiding plate 26 and the left light-guiding plate 28 according to the embodiment are optical units formed by a light transmission type resin, are prisms, for example, and guide image light output by the right display unit 22 and the left display unit 24 to the eyes of the user.

Light adjustment plates (not illustrated) may be installed on the surfaces of the right light-guiding plate 26 and the left light-guiding plate 28. The light adjustment plates are optical elements on thin plates with different transmittance in accordance with light wavelength regions and function as so-called wavelength filters. For example, the light adjustment plates are disposed to cover the front side of the front frame 27 which is an opposite side to the side of the eyes of the user. By appropriately selecting optical characteristics of the light adjustment plates, it is possible to adjust transmittance of light with any wavelength regions such as the visible light, infrared light, and ultraviolet light and it is possible to adjust an amount of outside light which is incident on the right light-guiding plate 26 and the left light-guiding plate 28 from the outside and transmits through the right light-guiding plate 26 and the left light-guiding plate 28.

The image display unit 20 guides image light generated by the right display unit 22 and the left display unit 24 to the right light-guiding plate 26 and the left light-guiding plate 28. The image light guided to the right light-guiding plate 26 and the left light-guiding plate 28 is incident on the right and left eyes of the user and causes the user to view virtual images. Thus, the image display unit 20 displays images.

When outside light transmits through the right light-guiding plate 26 and the left light-guiding plate 28 from the front side of the user and is incident on the eyes of the user, the outside light and the image light configuring the virtual images are incident on the eyes of the user and the strength of the outside light has an influence on visibility of the virtual images. Therefore, for example, by mounting light adjustment plates on the front frame 27 and appropriately selecting or adjusting optical characteristics of the light adjustment plates, it is possible to adjust easiness of view of the virtual images. In a typical example, it is possible to use the light adjustment plates with light transmission to the degree that the user wearing the HMD 100 can view at least a scenery outside. When the light adjustment plates are used, it is possible to expect the advantages of protecting the right light-guiding plate 26 and the left light-guiding plate 28 and preventing damage or attachment of dirt on the right light-guiding plate 26 and the left light-guiding plate 28. The light adjustment plates may be detachably mounted on the front frame 27 or the right light-guiding plate 26 and the left light-guiding plate 28. A plurality of types of light adjustment plates may be mounted to be exchanged or the light adjustment plates may be omitted.

A camera 61 is disposed in the front frame 27 of the image display unit 20. The configuration and disposition of the camera 61 are determined so that an outside scenery direction viewed in the state in which the user wears the image display unit 20 can be imaged. For example, the camera 61 is installed at a position at which the outside light transmitting through the right light-guiding plate 26 and the left light-guiding plate 28 is not blocked on the front surface of the front frame 27. In the example of FIG. 3, the camera 61 is disposed on the side of the end portion ER of the front frame 27. However, the camera 61 may be disposed on the side of the end portion EL or may be disposed at the connection portion of the right light-guiding plate 26 and the left light-guiding plate 28.

The camera 61 is a digital camera that includes an image sensor such as a CCD or a CMOS and an imaging lens. The camera 61 according to the embodiment is a single-lens camera, but may be a stereo camera. The camera 61 images a front side direction of the HMD 100, in other words, at least partial outside scenery (the real space) in a visual field direction of the user in the state in which the HMD 100 is worn. In other words, the camera 61 images a range or a direction overlapping the visual field of the user and images a direction in which the user sees. The direction and area of an angle of view of the camera 61 can be appropriately set. In the embodiment, as will be described below, the angle of view of the camera 61 includes an outside world which the user can view through the right light-guiding plate 26 and the left light-guiding plate 28. More preferably, the angle of view of the camera 61 is set so that the entire visual field of the user which is viewable through the right light-guiding plate 26 and the left light-guiding plate 28 can be imaged.

Figure 7:
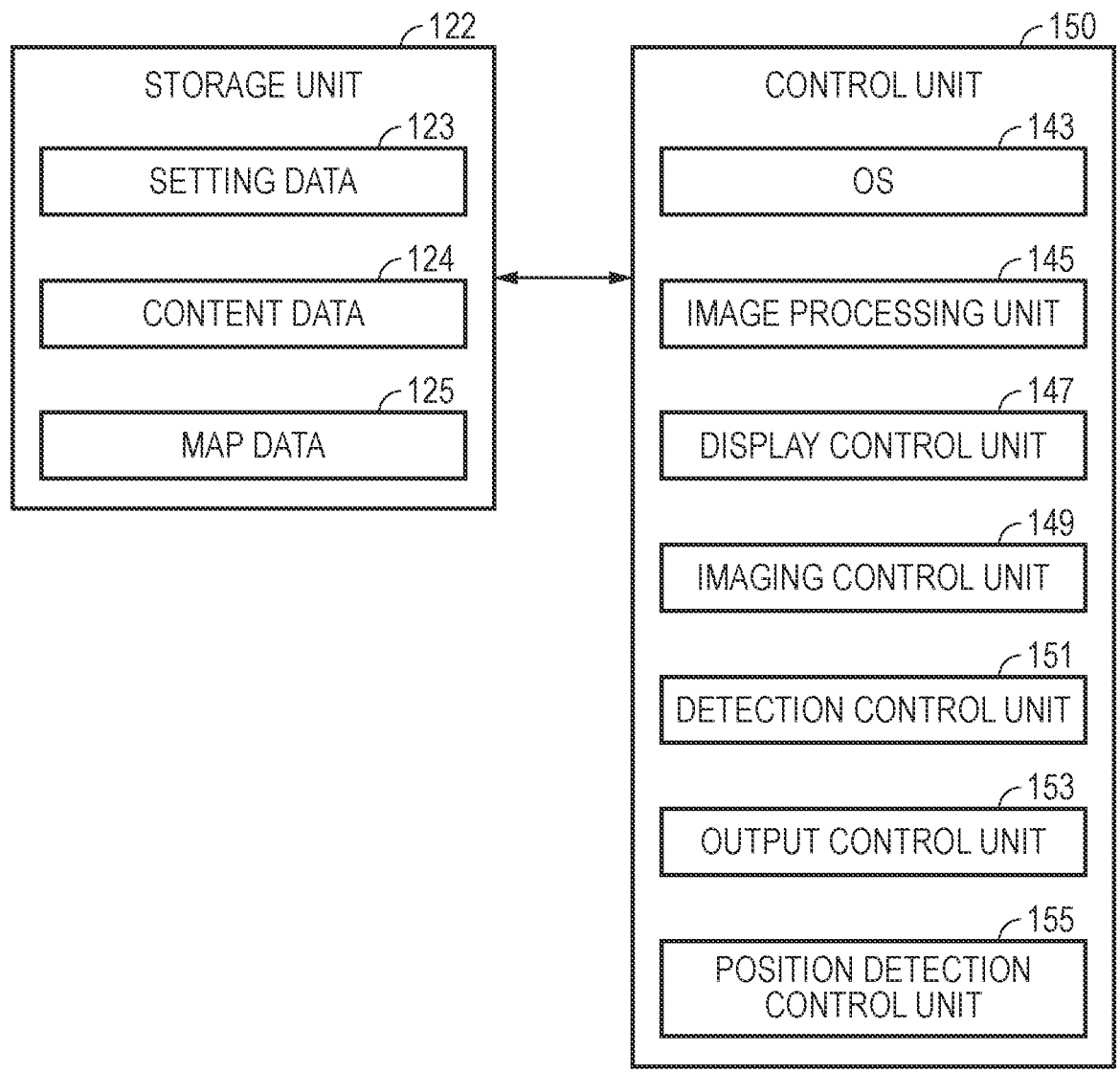
FIG. 7 is a functional block diagram illustrating a control device.

The camera 61 performs imaging under the control of an imaging control unit 149 included in a control unit 150 (see FIG. 7). The camera 61 outputs captured image data to the control unit 150 via an interface 211 to be described below.

The HMD 100 may include a distance sensor (not illustrated) that measures a distance to a measurement target located in a preset measurement direction. The distance sensor can be disposed, for example, in the connection portion of the right light-guiding plate 26 and the left light-guiding plate 28 in the front frame 27. In this case, in the state in which the image display unit 20 is worn, the position of the distance sensor is nearly middle of both eyes of the user in the horizontal direction and is above both eyes of the user in the vertical direction. For example, the measurement direction of the distance sensor can be set to the front side direction of the front frame 27, in other words, a direction overlapping the imaging direction of the camera 61. The distance sensor can be configured to include, for example, a light source such as an LED or a laser diode and a light reception unit that receives reflected light when light is emitted by the light source and is reflected from the measurement target. The distance sensor may perform a triangulation process or a distance measurement process based on a time difference under the control of the control unit 150. The distance sensor may be configured to include a sound source that emits an ultrasonic wave and a detection unit that receives the ultrasonic wave reflected from the measurement target. In this case, the distance sensor may perform a distance measurement process based on a time difference up to reflection of the ultrasonic wave under the control of the control unit 150.

Figure 4:
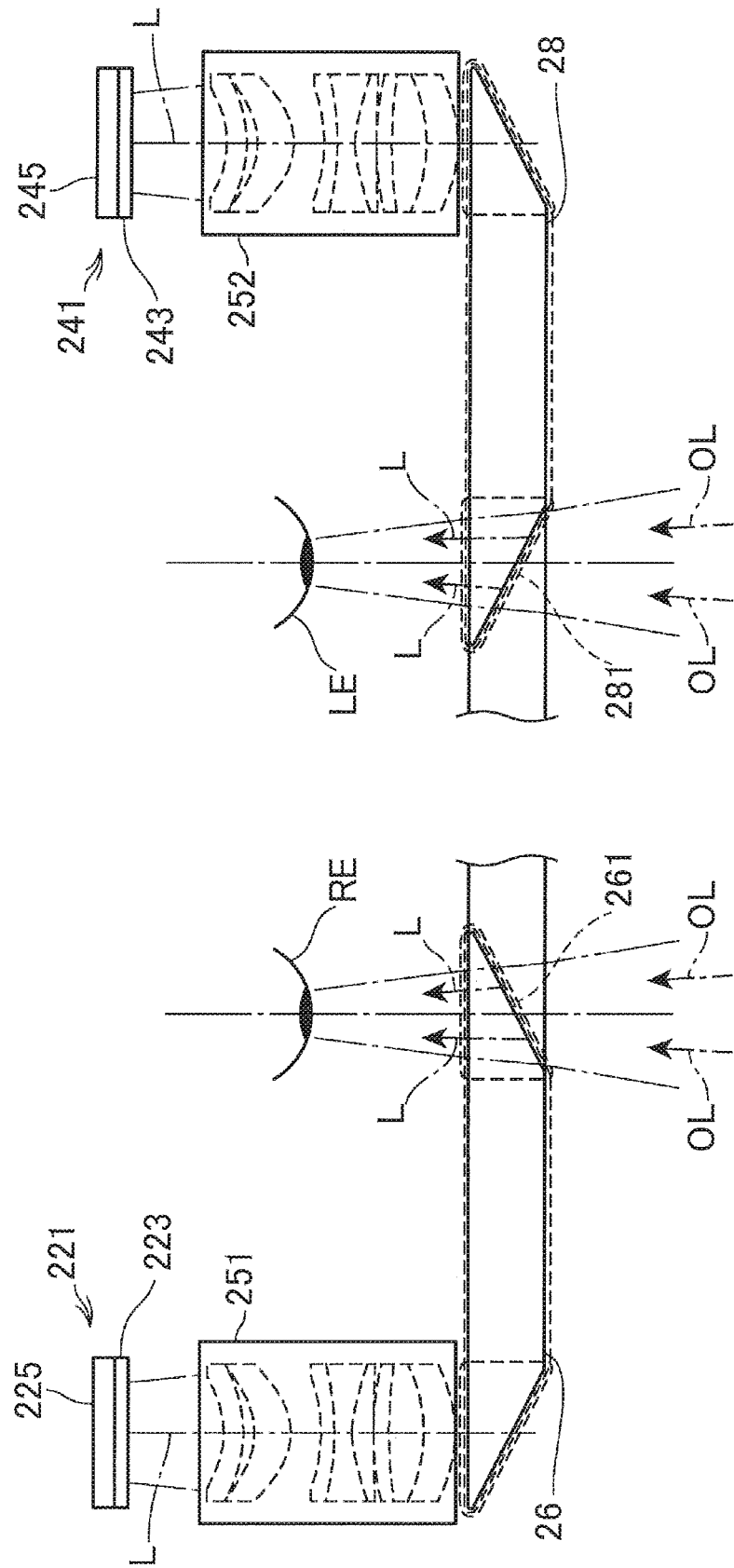
FIG. 4 is a diagram illustrating a configuration of an optical system of the HMD.

FIG. 4 is a plan view illustrating main units in the configuration of an optical system included in the image display unit 20. In FIG. 4, a left eye LE and a right eye RE of the user are illustrated for description.

As illustrated in FIG. 4, the right display unit 22 and the left display unit 24 are configured to be bilaterally symmetric. As a configuration in which an image is viewed by the right eye RE of the user, the right display unit 22 includes an organic light-emitting diode (OLED) unit 221 that emits image light and a right optical system. 251 that includes a lens group guiding image light L emitted by the OLED unit 221. The image light L is guided to the right light-guiding plate 26 by the right optical system 251.

The OLED unit 221 includes an OLED panel 223 and an OLED driving circuit 225 that drives the OLED panel 223. The OLED panel 223 is a spontaneous emission type display panel in which light-emitting elements emitting light by organic electroluminescence to emit color light of red (R), green (G), and blue (B), respectively are disposed in a matrix form. The OLED panel 223 includes a plurality of pixels in which a unit including one of R, G, and B elements functions as one pixel and forms an image by the pixels disposed in the matrix form. The OLED driving circuit 225 performs selection of the light-emitting elements included in the OLED panel 223 and conduction to the light-emitting elements and causes the light-emitting elements of the OLED panel 223 to emit light under the control of the control unit 150 (see FIG. 7). The OLED driving circuit 225 is fixed to the rear surface of the OLED panel 223, that is, the rear side of a light emission surface, by bonding or the like. The OLED driving circuit 225 may be configured with, for example, a semiconductor device driving the OLED panel 223 and may be mounted on a substrate (not illustrated) fixed to the rear surface of the OLED panel 223. A temperature sensor 217 is mounted on the substrate.

The OLED panel 223 may be configured such that light-emitting elements emitting light with white are disposed in a matrix form and color filters corresponding to the colors of R, G, and B are disposed to be superimposed. The OLED panel 223 that has a WRGB configuration including light-emitting elements emitting white (W) light in addition to the light-emitting elements radiating the color light of R, G, and B may be used.

The light optical system 251 has a collimate lens that forms the image light L emitted from the OLED panel 223 as a light flux in a parallel state. The image light L formed as the light flux in the parallel state by the collimate lens is incident on the right light-guiding plate 26. A plurality of reflection surfaces reflecting the image light L are formed along a light path along which the light is guided inside the right light-guiding plate 26. The image light L is reflected a plurality of times inside the right light-guiding plate 26 to be guided to the side of the right eye RE. In the right light-guiding plate 26, a half mirror 261 (reflection surface) located in front of the right eye RE is formed. The image light L is reflected by the half mirror 261 to be emitted toward the right eye RE from the right light-guiding plate 26. Then, the image light L is formed on the retina of the right eye RE so that the user can view the image.

As a configuration in which an image is viewed by the left eye LE of the user, the left display unit 24 includes an OLED unit 241 that emits image light and a left optical system 252 that includes a lens group guiding image light L emitted by the OLED unit 241. The image light L is guided to the left light-guiding plate 28 by the left optical system 252.

The OLED unit 241 includes an OLED panel 243 and an OLED driving circuit 245 that drives the OLED panel 243. The OLED panel 243 is a spontaneous emission type display panel as in the OLED panel 223. The OLED driving circuit 245 performs selection of the light-emitting elements included in the OLED panel 243 and conduction to the light-emitting elements and causes the light-emitting elements of the OLED panel 243 to emit light under the control of the control unit 150 (see FIG. 7). The OLED driving circuit 245 is fixed to the rear surface of the OLED panel 243, that is, the rear side of a light emission surface, by bonding or the like. The OLED driving circuit 245 may be configured with, for example, a semiconductor device driving the OLED panel 243 and may be mounted on a substrate (not illustrated) fixed to the rear surface of the OLED panel 243. A temperature sensor 239 is mounted on the substrate.

The left optical system 252 has a collimate lens that forms the image light L emitted from the OLED panel 243 as a light flux in a parallel state. The image light L formed as the light flux in the parallel state by the collimate lens is incident on the left light-guiding plate 28. The left light-guiding plate 28 is an optical element in which a plurality of reflection surfaces reflecting the image light L are formed and is, for example, a prism. The image light L is reflected a plurality of times inside the left light-guiding plate 28 to be guided to the side of the left eye LE. In the left light-guiding plate 28, a half mirror 281 (reflection surface) located in front of the left eye LE is formed. The image light L is reflected by the half mirror 281 to be emitted toward the left eye LE from the left light-guiding plate 28. Then, the image light L is formed on the retina of the left eye LE so that the user can view the image.

In this configuration, the HMD 100 functions as a see-through display device. That is, The image light L reflected by the half mirror 261 and outside light OL transmitted through the right light-guiding plate 26 are incident on the right eye RE of the user. In addition, the image light L reflected by the half mirror 281 and the outside light OL transmitted through the half mirror 281 are incident on the left eye LE. In this way, the HMD 100 causes the image light L of the image processed inside and the outside light OL to be incident on the eyes of the user repeatedly so that the user can see the outside scenery through the right light-guiding plate 26 and the left light-guiding plate 28 and view the image formed by the image light L and overlapped on the outside scenery.

The half mirrors 261 and 281 are image extraction units that reflect the image light output by the right display unit 22 and the left display unit 24 and extract the images and can be said to be display units.

The left optical system 252 and the left light-guiding plate 28 are collectively referred to as a "left light-guiding unit" and the right optical system 251 and the right light-guiding plate 26 are collectively referred to as a "right light-guiding unit". The configurations of the right light-guiding unit and the left light-guiding unit are not limited to the foregoing examples. Any scheme can be used as long as virtual images can be formed in front of the eyes of the user using image light. For example, a diffraction grating may be used or a transflective film may be used.

Referring back to FIG. 3, the control device 10 and the image display unit 20 are connected by a connection cable 40. The connection cable 40 is detachably mounted to be connected to a connector (not illustrated) installed in a lower portion of the case 10A and is connected to various circuits installed inside the image display unit 20 from the front end of the left hold unit 23. The connection cable 40 includes a metal cable or an optical fiber cable transmitting digital data and may include a metal cable transmitting an analog signal. A connector 46 is installed in a halfway portion of the connection cable 40. The connector 46 is a jack connecting a stereo mini-plug. The connector 46 and the control device 10 are connected by, for example, a line transmitting an analog sound signal. In the configuration example illustrated in FIG. 3, a headset 30 including a microphone 63 and a right earphone 32 and a left earphone 34 configuring a stereo headphone is connected to the connector 46.

The control device 10 and the image display unit 20 may be wirelessly connected. For example, the control device 10 and the image display unit 20 may be configured to transmit and receive a control signal or data through wireless communication conforming with a standard such as Bluetooth or a wireless LAN (including Wi-Fi (registered trademark)).

In the microphone 63, for example, as illustrated in FIG. 3, a sound collection unit of the microphone 63 is disposed to be directed to a visual line direction of the user and collects sounds. Then, a sound signal is output to the sound interface 182 (see FIG. 6). The microphone 63 may be, for example, a monaural microphone or a stereo microphone, may be a microphone having directivity, or may be a nondirectional microphone.

The control device 10 includes the button 11, the LED indicator 12, the track pad 14, the upper and lower keys 15, the changeover switch 16, and the power switch 18 as operation units operated by the user. The operation units are disposed on the surface of the case 10A.

The button 11 includes a key or a switch for operating the control device 10. The key or the switch is displaced through a pressure operation. For example, the button 11 includes a menu key, a home key, and a "return" key for performing an operation on an operating system 143 (see FIG. 7) executed by the control device 10.

The LED indicator 12 is turned on or off to correspond to an operation state of the HMD 100. The upper and lower keys 15 are used to input an instruction to increase or decrease volume output from the right earphone 32 and the left earphone 34 or input an instruction to increase or decrease brightness of display of the image display unit 20. The changeover switch 16 is a switch that changes over an input corresponding to an operation of the upper and lower keys 15. The power switch 18 is a switch that switches on/off of power of the HMD 100 and is, for example, a slide switch.

The track pad 14 has an operation surface on which a touch operation is detected and outputs an operation signal in response to an operation on the operation surface. A detection scheme on the operation surface is not limited. An electrostatic type, a pressure detection type, an optical type, or other schemes can be adopted. A touch (touch operation) on the track pad 14 is detected by a touch sensor (not illustrated). An LED display unit 17 is installed on the track pad 14. The LED display unit 17 includes a plurality of LEDs, transmits light of each LED through the track pad 14, displays operation icons or the like. The icons or the like function as software buttons.

Figure 5:
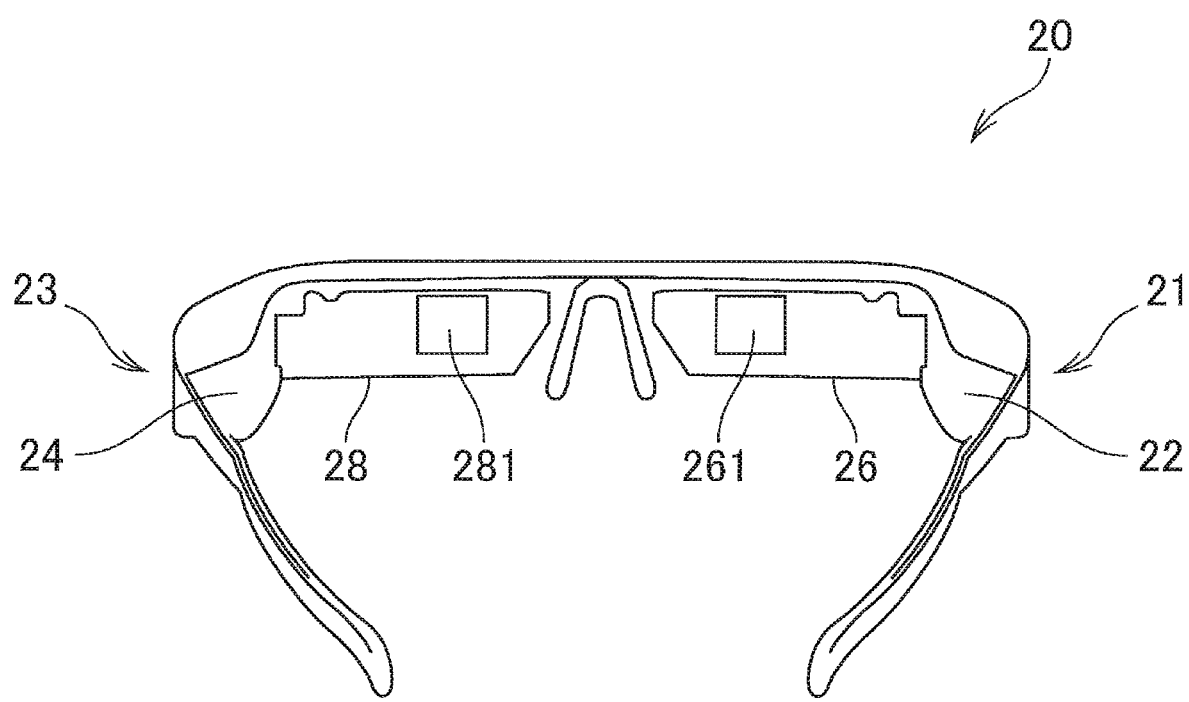
FIG. 5 is a perspective view illustrating a configuration of an image display unit.

FIG. 5 is a perspective view illustrating the configuration of the image display unit 20 and illustrates configurations of main units when the image display unit 20 is viewed on the head side of the user. FIG. 5 illustrates the side of the image display unit 20 coming into contact with the head of the user, in other words, a side viewed by the right eye RE and the left eye LE of the user. In other words, the rear sides of the right light-guiding plate 26 and the left light-guiding plate 28 are viewed.

In FIG. 5, the half mirror 261 radiating the image light to the right eye RE of the user and the half mirror 281 radiating the image light to the left eye LE are viewed as substantially quadrangular regions. The entire right light-guiding plate 26 and left light-guiding plate 28 including the half mirrors 261 and 281 transmit the outside light, as described above. Therefore, the user views the outside scenery transmitted through the entire right light-guiding plate 26 and left light-guiding plate 28 and views rectangular display images at the positions of the half mirrors 261 and 281.

The camera 61 is disposed at the right end portion of the image display unit 20 and images a direction in which both eyes of the user see, that is, the front side of the user. An optical axis of the camera 61 is considered as a direction including a visual line direction of the right eye RE and the left eye LE. An outside scenery which can be viewed in the state in which the user wears the HMD 100 may not be infinity. For example, when the user sees at a target located in front of the user with both eyes, a distance between the user and the target is in a range of about 30 cm to 10 m in many cases and is in a range of about 1 m to 4 m in more cases. Accordingly, for the HMD 100, standards of the upper limit and the lower limit of a distance between the user and a target at the time of normal use may be determined. The standards may be calculated by investigation or experiment or may be set by the user. An optical axis or an angle of view of the camera 61 is preferably set so that a target is included in the angle of view when a distance between the target and the user at the time of normal use is equivalent to the set standard of the upper limit and is equivalent to the set standard of the lower limit.

In general, an angle of human visibility is considered to be about 200 degrees in the horizontal direction and about 125 degrees in the vertical direction. Of the angle of human view, an effective angle of view at which an information capability is excellent is about 30 degrees in the horizontal direction and 20 degrees in the vertical direction. Further, a stable field of fixation in which a point of fixation at which a human being sees is regarded to be stabilized rapidly is in a range of about 60 to 90 degrees in the horizontal direction and is in the range of about 45 to 70 degrees in the vertical direction. When a point of fixation is a target located in front of the user, an effective field of view is about 30 degrees in the horizontal direction and about 20 degrees in the vertical direction centering on the visual line of each of the right eye RE and the left eye LE in the field of view of the user. About 60 to 90 degrees in the horizontal direction and about 45 to 70 degrees in the vertical direction are a field of stable fixation. About 200 degrees in the horizontal direction and about 125 degrees in the vertical direction are also the angle of visibility. Further, an actual field of view in which the user sees through the right light-guiding plate 26 and the left light-guiding plate 28 can be called a field of view (FOV). In the configurations illustrated in FIGS. 3 and 4 according to the embodiment, the actual field of view is equivalent to an actual field of view in which the user sees through the right light-guiding plate 26 and the left light-guiding plate 28. The actual field of view is narrower than the angle of visibility and the stable field of fixation and is broader than the effective field of view.

At an angle of view of the camera 61, a broader range than a field of view of the user is preferably imaged. Specifically, the angle of view is preferably broader than at least an effective field of view of the user. The angle of view is more preferably broader than the actual field of view of the user. The angle of view is further more preferably broader than the stable field of fixation of the user. An angle of view C is most preferably broader than angles of visibility of both eyes of the user.

The camera 61 may be configured to include a so-called wide angle lens as an imaging lens and to image a large angle of view. The wide angle lens may include a lens which is called a super-wide angle lens or a semi-wide angle lens or may include a fixed focal lens or a zoom lens. The camera 61 may be configured to include a lens group formed by a plurality of lenses.

Figure 6:
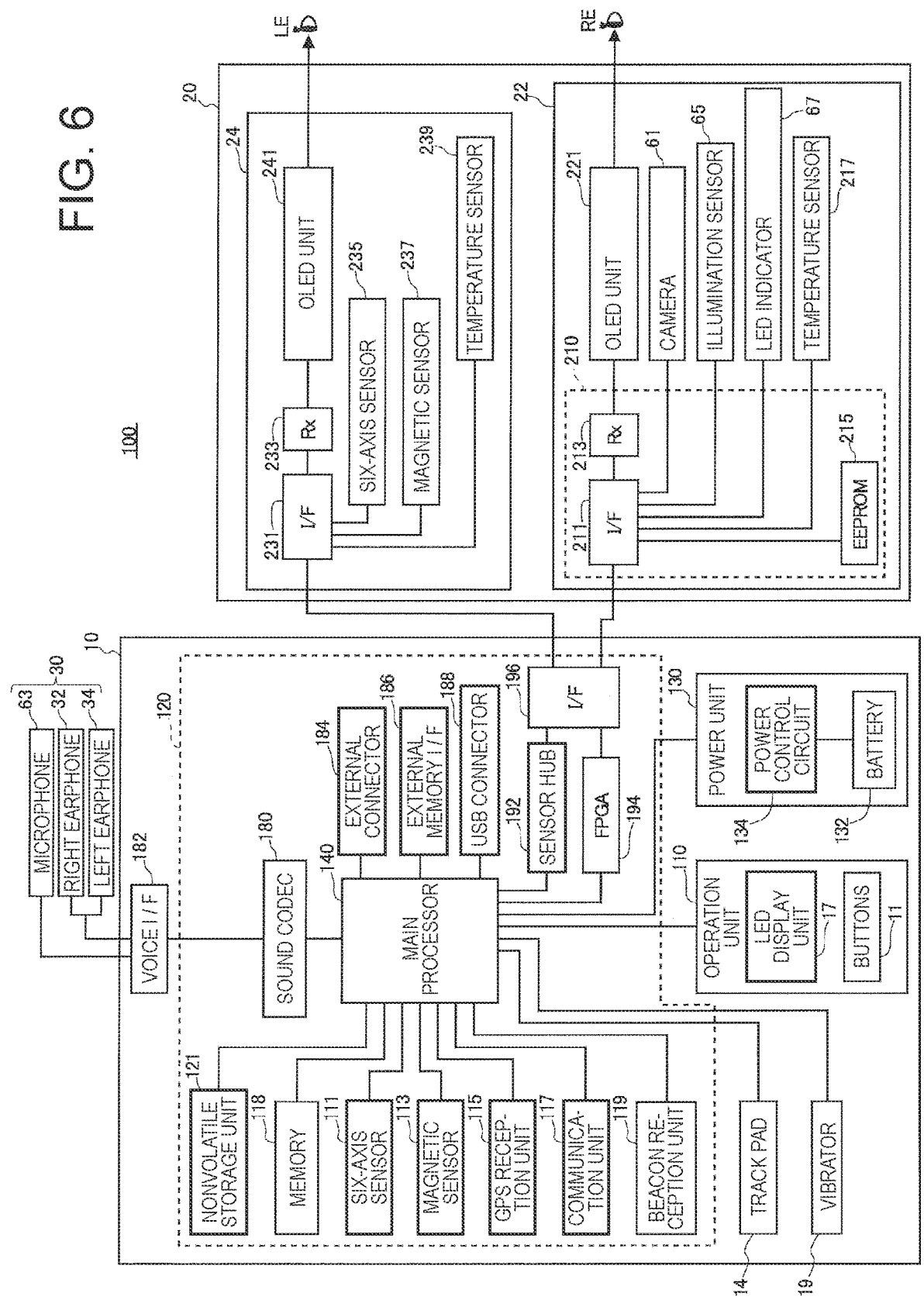
FIG. 6 is a block diagram illustrating the HMD.

FIG. 6 is a block diagram illustrating a configuration of each unit included in the HMD 100.

The control device 10 includes a main processor 140 that executes a program to control the HMD 100. A memory 118 and a nonvolatile storage unit 121 are connected to the main processor 140. The track pad 14 and an operation unit 110 are connected as input devices to the main processor 140. A six-axis sensor 111 and a magnetic sensor 113 are connected as sensors to the main processor 140. A GPS reception unit 115, a communication unit 117, a beacon reception unit 119, a sound codec 180, an external connector 184, an external memory interface 186, a USB connector 188, a sensor hub 192, and an FPGA 194 are connected to the main processor 140. These elements function as an interface with the outside. The beacon reception unit 119 is equivalent to a "reception unit" according to the invention.

The main processor 140 is mounted on a controller substrate 120 contained in the control device 10. The memory 118, the nonvolatile storage unit 121, and the like may be mounted on the controller substrate 120 in addition to the main processor 140. In the embodiment, the six-axis sensor 111, the magnetic sensor 113, the GPS reception unit 115, the communication unit 117, the memory 118, the nonvolatile storage unit 121, the sound codec 180, and the like are mounted on the controller substrate 120. The external connector 184, the external memory interface 186, the USB connector 188, the sensor hub 192, the FPGA 194, and an interface 196 may be configured to be mounted on the controller substrate 120.

When the main processor 140 executes a program, the memory 118 forms a work area in which a program to be executed and data to be processed are temporarily stored. The nonvolatile storage unit 121 is configured with a flash memory or an embedded multi media card (eMMC). The nonvolatile storage unit 121 stores a program executed by the main processor 140 or various kinds of data processed when the main processor 140 executes a program.

The main processor 140 detects a touch operation on the operation surface of the track pad 14 and acquires an operation position based on an operation signal input from the track pad 14.

The operation unit 110 includes the button 11 and the LED display unit 17. When an operator such as a button or a switch included in the button 11 is operated, the operation unit 110 outputs an operation signal corresponding to the operated operator to the main processor 140.

The LED display unit 17 performs control such that the LED indicator 12 is turned on and off under the control of the main processor 140. The LED display unit 17 may be configured to include an LED (not illustrated) disposed immediately below the track pad 14 (see FIG. 3) and a driving circuit that turns on the LED. In this case, the LED display unit 17 turns on, blinks, and turns off the LED under the control of the main processor 140.

The six-axis sensor 111 is a motion sensor (an inertial sensor) that includes a triaxial acceleration sensor and a triaxial gyro (angular velocity) sensor. As the six-axis sensor 111, an inertial measurement unit (IMU) in which the sensors are moduled may be adopted.

The magnetic sensor 113 is, for example, a triaxial geomagnetic sensor.

The six-axis sensor 111 and the magnetic sensor 113 output a detected value to the main processor 140 at a predesignated sampling period. The six-axis sensor 111 and the magnetic sensor 113 output detected values to the main processor 140 at a timing designated by the main processor 140 in response to a request of the main processor 140.

The GPS reception unit 115 includes a GPS antenna (not illustrated) and receives GPS signals transmitted from GPS satellites. The GPS reception unit 115 outputs the received GPS signals to the main processor 140. The GPS reception unit 115 measures signal strengths of the received GPS signals and outputs the signal strengths of the GPS signals to the main processor 140. As the signal strength, for example, information such as a received signal strength indication (RSSI), an electric field strength, a magnetic field strength, or a signal-to-noise ratio (SNR) can be used.

The communication unit 117 performs wireless communication with an external device. The communication unit 117 is configured to include an antenna, an RF circuit, a baseband circuit, and a communication control circuit or is configured with a device in which these elements are integrated. For example, the communication unit 117 performs wireless communication in conformity to a standard such as Bluetooth or a wireless LAN (including Wi-Fi).

The beacon reception unit 119 receives a beacon signal transmitted as a wireless signal. The beacon reception unit 119 can be configured to include, for example, a reception antenna, a radio frequency (RF) circuit, an amplifier, an encoding/decoding circuit, and other interface circuits.

The beacon reception unit 119 is a reception unit that receives a radio signal transmitted by an external transmitter. In the embodiment, the beacon reception unit 119 receives the beacon signals transmitted by the beacon devices 200 (see FIG. 1) of the system 1. Any specific configurations of the radio signals transmitted and received by the beacon reception unit 119 and the beacon device 200, the reception circuit included in the beacon reception unit 119, and the transmission circuit included in the beacon device 200 may be used and known communication standards may be adopted.

As described above, the beacon device 200 may transmit a beacon signal with a 2.4 GHz band using a Bluetooth Low Energy (BLE) technology. In this case, the beacon reception unit 119 may be configured to include a reception circuit conforming with the Bluetooth standard. In this configuration, it is possible to achieve power saving of the beacon device 200. Because of the widely spread technology, there is the advantage of realizing the configurations of the beacon device 200 and the beacon reception unit 119 with easiness and at low cost.

For example, the beacon reception unit 119 and the beacon device 200 may be configured to transmit and receive the beacon signal with the 2.4 GHz band in conformity to the ZigBee standard, as described above. Even in this case, it is possible to save the power of the beacon device 200. There is the advantage that the configuration of the beacon reception unit 119 is common to a part of the circuit transmitting and receiving a wireless signal of Bluetooth or WiFi of the 2.4 GHz band.

The beacon device 200 may be configured to transmit a beacon signal in conformity to a wireless smart utility network (WiSUN (registered trademark)) standard. In this configuration, since a beacon signal can be transmitted and received at a distance of 1 km to hundreds of m, it is particularly advantageous when the beacon device 200 is disposed in a wide area and at a low density. Since the WiSUN technology is a technology for realizing long-term driving of about 10 years by a battery, it is possible to achieve a long life and a reduction of a maintenance frequency of the beacon device 200.

The beacon device 200 may be configured to transmit a beacon signal such as a WiFi Aware or a WiFi beacon which is a beacon signal in which a WiFi (registered trademark) technology (specifically, IEEE 802.11a/b/g/n/ac or the like) is used. In this case, there is the advantage that the beacon device 200 and the beacon reception unit 119 can be realized with a circuit configuration in which the WiFi communication is performed. The beacon device 200 may be configured such that a beacon signal including SSID (subsystem identification) is transmitted and the beacon signal is received by the beacon reception unit 119 in order to establish communication of a wireless LAN including WiFi.

The beacon device 200 may be configured to transmit a plurality of types of beacon signals among the above-described various types of communication schemes. The beacon reception unit 119 may be configured to receive the beacon signals transmitted by the beacon devices 200. For example, the beacon reception unit 119 may also be configured to receive the plurality of types of beacon signals among the above-described various types of communication schemes.

The beacon device 200 may be configured to transmit a light beacon signal using light such as infrared light. In this case, the beacon reception unit 119 may be configured to include a light reception unit that receives the light beacon signal.

As one embodiment of the invention, the beacon reception unit 119 performs intermittent reception under the control of the main processor 140 and outputs the received beacon signals to the main processor 140. The intermittent reception is a process of intermittently receiving the beacon signals to reduce power consumption as much as possible for a time other than a reception time.

The beacon reception unit 119 performs an operation of receiving the beacon signal during each constant period (hereinafter referred to as a reception period). At one period of the reception period of the beacon reception unit 119, a duration in which the beacon reception unit 119 performs the operation of receiving the beacon signal is referred to as a reception duration and a duration in which the beacon reception unit 119 does not perform the operation of receiving the beacon signal is referred to as a non-reception duration. The beacon reception unit 119 performs the operation of receiving the beacon signal during the reception duration and stops the reception operation when the non-reception duration comes. When the non-reception duration has elapsed, the reception duration comes and the beacon reception unit 119 resumes the operation of receiving the beacon signal. The reception duration is equivalent to a "first duration" according to the invention and the non-reception duration is equivalent to a "second duration" according to the invention.

During the reception duration, power is supplied from a power unit 130 and the beacon reception unit 119 enters a state in which the beacon reception unit 119 can receive the beacon signal. When the beacon signal is transmitted from the beacon device 200, the beacon reception unit 119 performs the reception operation to receive the beacon signal. During the non-reception duration, the supply of the power from the power unit 130 to the beacon reception unit 119 is off and the beacon reception unit 119 does not perform the operation of receiving the beacon signal. During the non-reception duration, the supply of the power to the beacon reception unit 119 may not be stopped, but the power supplied to the beacon reception unit 119 may be more reduced than the power supplied during the reception duration. During the non-reception duration, the beacon reception unit 119 is supplied with power, but does not perform the operation of receiving the beacon signal.

The beacon reception unit 119 measures the signal strength of the received beacon signal and outputs information indicating the measured signal strength to the main processor 140. The signal strength is equivalent to a "reception strength" according to the invention. As the signal strength of the beacon signal, for example, information such as a received signal strength, an electric field strength, a magnetic field strength, or a signal-to-noise ratio can be used.

In a state in which the power is supplied from the power unit 130, the beacon reception unit 119 may be configured to be able to switch between the reception duration in which the beacon signal is received and the non-reception duration. In this case, the main processor 140 can cause the beacon reception unit 119 to perform operations of the reception duration and the non-reception duration without controlling supply of power from the power unit 130 to the beacon reception unit 119. In this case, the lengths of the reception period, the reception duration, and the non-reception duration of the beacon reception unit 119 may be set by the beacon reception unit 119 or may be controlled by the main processor 140.

A mode of the beacon signal which can be received by the beacon reception unit 119 may be one of the beacon signals 2A, 2B, and 2C illustrated in FIG. 2 or may be another mode of a signal. In an operation according to a first embodiment to be described below, the beacon signal may include at least the beacon ID or one of the beacon signals 2A, 2B, and 2C may also be realized.

The sound interface 182 is an interface that inputs and outputs a sound signal. In the embodiment, the sound interface 182 includes the connector 46 (see FIG. 3) installed in the connection cable 40. The connector 46 is connected to the headset 30. The sound signal output by the sound interface 182 is input to the right earphone 32 and the left earphone 34. Thus, the right earphone 32 and the left earphone 34 output sounds. The microphone 63 included in the headset 30 collects sounds and outputs the sound signals to the sound interface 182. The sound signals input from the microphone 63 to the sound interface 182 are input to the external connector 184.

The sound codec 180 is connected to the sound interface 182 and encodes and decodes the sound signal input and output via the sound interface 182. The sound codec 180 may include an A/D converter that performs conversion from an analog sound signal to digital sound data and a D/A converter that performs its reverse conversion. For example, in the HMD 100 according to the embodiment, the right earphone 32 and the left earphone 34 output sounds and the microphone 63 collects sounds. The sound codec 180 converts the digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector that connects an external device communicating with the main processor 140. The external connector 184 is, for example, an interface that connects an external device to the main processor 140 and connects the external device when a program executed by the main processor 140 is debugged or a log of an operation of the HMD 100 is collected.

The external memory interface 186 is an interface capable of connecting a portable memory device and includes, for example, an interface circuit and a memory card slot on which a card type recording medium is mounted and which can read data. The size, the shape, and the standard of the card type recording medium in this case are not limited, but can be appropriately changed.

The universal serial bus (USB) connector 188 includes an interface circuit and a connector conforming with the USB standard. The USB connector 188 can connect a USB memory device, a smartphone, a computer, or the like. The size or the shape of the USB connector 188 and a suitable USB standard version can be appropriately selected and changed.

The sensor hub 192 and the FPGA 194 are connected to the image display unit 20 via the interface (I/F) 196. The sensor hub 192 acquires detected values of various sensors included in the image display unit 20 and outputs the detected values to the main processor 140. The FPGA 194 performs a process for data transmitted and received between the units, the main processor 140 and the image display unit 20 and transmission via the interface 196.

The HMD 100 includes a vibrator 19. The vibrator 19 includes a motor and an eccentric rotor (neither of which is illustrated) and may have another necessary configuration. The vibrator 19 rotates the motor under the control of the main processor 140 to produce vibration. For example, when an operation on the operation unit 110 is detected or when the HMD 100 is powered on/off or other cases, the vibrator 19 in the HMD 100 produces vibration in a predetermined vibration pattern.

The right display unit 22 and the left display unit 24 of the image display unit 20 are connected to the control device 10. As illustrated in FIG. 3, in the HMD 100, the connection cable 40 is connected to the left hold unit 23, a wiring connected to the connection cable 40 is buried in the image display unit 20, and the right display unit 22 and the left display unit 24 are each connected to the control device 10.

The right display unit 22 includes a display unit substrate 210. An interface (I/F) 211 connected to the interface 196, a reception unit (Rx) 213 receiving data input from the control device 10 via the interface 211, and an EEPROM 215 are mounted on the display unit substrate 210.

The interface 211 connects the reception unit 213, the EEPROM 215, the temperature sensor 217, the camera 61, an illumination sensor 65, the LED indicator 67 to the control device 10.

The electrically erasable programmable read-only memory (EEPROM) 215 stores various kinds of data so that the main processor 140 can read the data. The EEPROM 215 stores data related to light emission characteristics or display characteristics of the OLED units 221 and 241 included in the image display unit 20 or data related to characteristics of a sensor included in the right display unit 22 or the left display unit 24. Specifically, a parameter related to gamma correction of the OLED units 221 and 241 and data for compensating detected values of the temperature sensors 217 and 239 are stored. The data is generated by inspection at the time of factory shipment of the HMD 100 and is written on the EEPROM 215. After shipment, the main processor 140 can perform a process using data of the EEPROM 215.

The camera 61 performs imaging in accordance with a signal input via the interface 211 and outputs captured image data or a signal indicating an imaging result to the control device 10.

As illustrated in FIG. 3, the illumination sensor 65 is installed in the end portion ER of the front frame 27 and is disposed to receive the outside light from the front of the user wearing the image display unit 20. The illumination sensor 65 outputs a detected value corresponding to a light reception amount (light reception strength).

As illustrated in FIG. 3, the LED indicator 67 is disposed near the camera 61 at the end portion ER of the front frame 27. While the camera 61 performs imaging, the LED indicator 67 is turned on to report that the imaging is being performed.

The temperature sensor 217 detects temperature and outputs a voltage value or a resistance value corresponding to the detected temperature as a detected value. The temperature sensor 217 is mounted on the rear surface of the OLED panel 223 (see FIG. 4). For example, the temperature sensor 217 may be mounted on the same substrate as the OLED driving circuit 225. In this configuration, the temperature sensor 217 mainly detects the temperature of the OLED panel 223.

The reception unit 213 receives data transmitted by the main processor 140 via the interface 211. The reception unit 213 outputs the received image data to the OLED driving circuit 225 (see FIG. 4) when the reception unit 213 receives image data of an image displayed by the OLED unit 221.

The left display unit 24 includes the display unit substrate 210. An interface (I/F) 231 connected to the interface 196 and a reception unit (Rx) 233 receiving data input from the control device 10 via the interface 231 are mounted on the display unit substrate 210. A six-axis sensor 235 and a magnetic sensor 237 are mounted on the display unit substrate 210.

The interface 231 connects the reception unit 233, the six-axis sensor 235, the magnetic sensor 237, and the temperature sensor 239 to the control device 10.

The six-axis sensor 235 is a motion sensor (an inertial sensor) that includes a triaxial acceleration sensor and a triaxial gyro (angular velocity) sensor. As the six-axis sensor 235, an IMU in which the sensors are moduled may be adopted.

The magnetic sensor 237 is, for example, a triaxial geomagnetic sensor.

The temperature sensor 239 detects temperature and outputs a voltage value or a resistance value corresponding to the detected temperature as a detected value. The temperature sensor 239 is mounted on the rear surface of the OLED panel 243 (see FIG. 4). For example, the temperature sensor 239 may be mounted on the same substrate as the OLED driving circuit 245. In this configuration, the temperature sensor 239 mainly detects the temperature of the OLED panel 243.

The temperature sensor 239 may be contained in the OLED panel 243 or the OLED driving circuit 245. The substrate may be a semiconductor substrate. Specifically, when the OLED panel 243 is mounted as an integrated circuit on an integrated semiconductor chip along the OLED driving circuit 245 as a Si-OLED, the temperature sensor 239 may be mounted on the semiconductor chip.

The camera 61, the illumination sensor 65, and the temperature sensor 217 included in the right display unit 22 and the six-axis sensor 235, the magnetic sensor 237, and the temperature sensor 239 included in the left display unit 24 are connected to the sensor hub 192. The sensor hub 192 performs setting and initialization of a sampling period of each sensor under the control of the main processor 140. In accordance with the sampling period of each sensor, the sensor hub 192 performs conduction to each sensor, transmission of control data, and acquisition of a detected value. The sensor hub 192 outputs a detected value of each sensor included in the right display unit 22 and the left display unit 24 to the main processor 140 at a preset timing. The sensor hub 192 may have a function of temporarily holding a detected value of each sensor in accordance with an output timing to the main processor 140. The sensor hub 192 may have a function of converting data into data with a unified data format to correspond to a difference in a signal format or a data format of an output value of each sensor and outputting the data to the main processor 140.

The sensor hub 192 starts and stops conduction to the LED indicator 67 under the control of the main processor 140 and turns the LED indicator 67 on or off in accordance with timings at which the camera 61 starts and ends imaging.

The control device 10 includes the power unit 130 and operates by power supplied from the power unit 130. The power unit 130 includes a rechargeable battery 132 and a power control circuit 134 that controls detection of a remaining capacity of the battery 132 and charging to the battery 132. The power control circuit 134 is connected to the main processor 140 and outputs a detected value or a detected value of the voltage of the remaining capacity of the battery 132 to the main processor 140. The power may be supplied from the control device 10 to the image display unit 20 based on the power supplied by the power unit 130. The main processor 140 may be able to control a state of power supply from the power unit 130 to each unit of the control device 10 and the image display unit 20.

FIG. 7 is a functional block diagram illustrating the storage unit 122 and the control unit 150 that form a control system of the control device 10. The storage unit 122 illustrated in FIG. 7 is a logical storage unit configured with the nonvolatile storage unit 121 (see FIG. 6) and may include the EEPROM 215. The control unit 150 and various functional units of the control unit 150 are formed cooperating software and hardware when the main processor 140 executes a program. The control unit 150 and each functional unit of the control unit 150 are configured with, for example, the main processor 140, the memory 118, and the nonvolatile storage unit 121.

The control unit 150 performs various processes using data stored in the storage unit 122 to control the HMD 100.

The storage unit 122 stores various kinds of data to be processed by the control unit 150. The storage unit 122 stores setting data 123, content data 124, and map data 125.

The setting data 123 includes various setting values for setting an operation of the HMD 100. When the control unit 150 uses a parameter, a determinant, a calculation equation, a lookup table (LUT), and the like at the time of controlling the HMD 100, the parameter, the determinant, the calculation equation, the lookup table, and the like may be included in the setting data 123.

The content data 124 is data of content included in an image or a video displayed by the image display unit 20 under the control of the control unit 150 and includes image data or video data. The content data 124 may include sound data. The content data 124 may include a plurality of pieces of image data. In this case, the plurality of images are not limited to images simultaneously displayed on the image display unit 20.

The content data 124 may be bidirectional content when a user's operation is received by the control device 10 and a process according to the received operation is performed by the control unit 150 at the time of displaying content on the display unit 20. In this case, the content data 124 may include image data of a menu screen displayed when an operation is received and data for determining a process corresponding to an item included in the menu screen.

The map data 125 is data in which positional information, a structure ID, and a floor ID are associated with a beacon ID.

When a beacon signal is received from the beacon device 200, the HMD 100 extracts a beacon ID from the received beacon signal. Based on the extracted beacon ID, the HMD 100 acquires the positional information, the structure ID, and the floor ID in which the beacon device 200 associated with the beacon ID is provided with reference to the map data 125.

The structure ID is identification information for specifying a structure in which the beacon device 200 is installed. Instead of the structure ID, information such as an address of the structure may be used. The floor ID is identification information for specifying a floor in the structure in which the beacon device 200 is installed. When the structure indicated by the structure ID is a structure that has a plurality of floors, a floor ID is assigned to each floor. The positional information is information indicating an installation place of the beacon device 200 indicated by the beacon ID and is, for example, latitude and longitude information.

The map data 125 may be generated by the HMD 100 or may be downloaded from a server device (not illustrated). When the map data 125 is generated by the HMD 100, the beacon signal transmitted by the beacon device 200 includes, for example, the beacon ID and positional information indicating the position of the beacon device 200. The HMD 100 generates the map data 125 based on the received beacon signal.

The control unit 150 has functions of an operating system (OS) 143, an image processing unit 145, a display control unit 147, an imaging control unit 149, a detection control unit 151, an output control unit 153, and a position detection control unit 155.

The function of the operating system 143 is a function of a control program stored in the storage unit 122 and the other functions are functions of application programs that are executed on the operating system 143.

The image processing unit 145 generates signals to be transmitted to the right display unit 22 and the left display unit 24 based on image data of an image or a video displayed by the image display unit 20. The signals generated by the image processing unit 145 may be a vertical synchronization signal, a horizontal synchronization signal, a clock signal, an analog image signal, and the like.

The image processing unit 145 may perform a resolution conversion process of converting the resolution of the image data into a resolution suitable for the right display unit 22 and the left display unit 24, as necessary. The image processing unit 145 may perform, for example, an image adjustment process of adjusting luminance and saturation of the image data or a 2D/3D conversion process of generating 2D image data from 3D image data or generating 3D image data from 2D image data. When the image processing unit 145 performs such an image process, the image processing unit 145 generates a signal for displaying an image based on the processed image data and transmits the signal to the image display unit 20 via the connection cable 40.

The image processing unit 145 may be configured not only to be realized when the main processor 140 executes a program but also with the main processor 140 and another hardware (for example, a digital signal processor (DSP)).

The display control unit 147 generates control signals for controlling the right display unit 22 and the left display unit 24 and controls of generation and emission of image light by the right display unit 22 and the left display unit 24 in accordance with the control signals. Specifically, the display control unit 147 controls the OLED driving circuits 225 and 245 to display images on the OLED panels 223 and 243. The display control unit 147 performs control of a timing at which the OLED driving circuits 225 and 245 perform drawing on the OLED panels 223 and 243 based on the signals output by the image processing unit 145 and control of the luminance of the OLED panels 223 and 243.

The imaging control unit 149 controls the camera 61 such that the camera 61 performs imaging, generates captured image data, and temporarily stores the captured image data in the storage unit 122. When the camera 61 is configured as a camera unit including a circuit that generates the captured image data, the imaging control unit 149 acquires the captured image data from the camera 61 and temporarily stores the captured image data in the storage unit 122.

The detection control unit 151 detects an operation on the track pad 14 and the operation unit 110 and outputs data corresponding to the operation. For example, when a button of the operation unit 110 is operated, the detection control unit 151 generates operation data indicating operation content and outputs the operation data to the display control unit 147. The display control unit 147 changes a display state in accordance with the operation data input from the detection control unit 151.

When an operation is detected on the track pad 14, the detection control unit 151 acquires the coordinates of an operation position on the track pad 14. The detection control unit 151 generates a trajectory of the operation position. The trajectory of the operation position is a trajectory of the operation position while the touch operation on the track pad 14 is not released, that is, while a touch state of an operator on the track pad 14 continues.

Based on the operation position detected by the detection control unit 151, the output control unit 153 performs one or more of vibration output by the vibrator 19 and sound output by the headset 30 according to setting of the display control data 126.

The position detection control unit 155 performs position detection to estimate a current position of the HMD 100 based on at least one of the GPS signals received by the GPS reception unit 115 and the beacon signals received by the beacon reception unit 119.

When the HMD 100 is determined to be outdoors, the position detection control unit 155 estimates the current position of the HMD 100 by the GPS positioning based on the GPS signals received by the GPS reception unit 115. When the HMD 100 is determined to be indoors, the position detection control unit 155 estimates the current position of the HMD 100 by the beacon positioning based on the beacon signals received by the beacon reception unit 119. When the HMD 100 is determined to be indoors, the position detection control unit 155 may correct the current position estimated by the GPS positioning in accordance with the current position estimated by the beacon positioning. When the HMD 100 is determined to be outdoors and estimation precision of the current position estimated based on the GPS positioning is determined to be low, the position detection control unit 155 may correct the current position calculated based on the GPS positioning based on a detected value of the six-axis sensor 111 or the magnetic sensor 113. The case in which the estimation precision of the current position estimated by the GPS positioning is low is, for example, a case in which the number of GPS signals received by the GPS reception unit 115 is 1 or 2 or a case in which an average signal strength of the GPS signals is low.

Here, the position detection control unit 155 may detect distances from the beacon device 200 by receiving the beacon signals transmitted at a plurality of frequencies by the beacon devices 200 in accordance with one scheme of the beacon positioning. Specifically, the devices (the beacon devices 200) transmitting the beacon signals transmit the beacon signals with different frequencies. Then, the position detection control unit 155 which is a reception side device obtains a phase difference between the received beacon signals. The position detection control unit 155 can calculate the distance from the beacon device 200 transmitting the beacon signal based on the phase difference and the wavelength of the beacon signal. As a specific known example, there is known "Chronos" (http://spectrum.ieee.org/techtalk/telecom/wireless/mit-turns-wifi-into-indoor-gps). In this known example, a transmission side device can transmit a signal at a frequency band of 35 included in the 2.4 GHz band and the 5.8 GHz band and skips the transmission frequency band at intervals of 2 to 3 microseconds. The reception side device calculates the distance by receiving a signal with each frequency and comparing the phase difference in each frequency of the received signal. The position detection control unit 155 can use another known distance measurement method.

The position detection control unit 155 determines whether the HMD 100 is indoors based on the number of GPS satellites which are transmission sources of the received GPS signals and an average signal strength of the received GPS signals. When the HMD 100 is indoors, the GPS signals are blocked by a structure or the like. Therefore, the average signal strength of the GPS signals transmitted from the GPS satellites is weakened and the number of receivable GPS signals also decreases. For this reason, in the embodiment, whether the HMD 100 is indoors is determined based on the number of GPS satellites and the average signal strength of the GPS signals.

The average signal strength is an average value of the signal strengths of the GPS signals received by the GPS reception unit 115.

When the current position of the HMD 100 is estimated based on the beacon signals, the position detection control unit 155 adjusts the reception period of the beacon reception unit 119. The position detection control unit 155 receives the beacon signals transmitted from the plurality of beacon devices 200 and estimates the current position of the HMD 100. Therefore, the position detection control unit 155 adjusts the reception period of the beacon reception unit 119 so that the beacon reception unit 119 can receive the number of beacon signals with which the beacon positioning can be performed. For example, when 3-point positioning is performed as the positioning process of the beacon positioning, the position detection control unit 155 adjusts the reception period of the beacon reception unit 119 so that the beacon reception unit 119 can receive at least three beacon signals. In addition, when 4-point positioning is performed as the positioning process of the beacon positioning, the position detection control unit 155 adjusts the reception period of the beacon reception unit 119 so that the beacon reception unit 119 can receive at least four beacon signals.

The position detection control unit 155 shifts the reception period of the beacon reception unit 119 in accordance with the transmission timing of the beacon signal desired to be received by the beacon reception unit 119.

For example, when the reception duration of the beacon reception unit 119 does not overlap the transmission duration of the beacon signal, the position detection control unit 155 advances or latens a starting timing of the reception duration to shift the reception period of the beacon reception unit 119. Thus, the beacon reception unit 119 is caused to receive the beacon signal by shifting the reception period.

When the reception duration of the beacon reception unit 119 does not overlap the transmission duration of the beacon device 200, the position detection control unit 155 may adjust the reception period by changing a duty ratio between the reception duration and the non-reception duration.

For example, when the reception duration of the beacon reception unit 119 does not overlap the transmission duration of the beacon signal, the position detection control unit 155 changes the length of the reception duration at one reception period without changing the reception period. That is, the position detection control unit 155 lengthens the length of the reception duration and shortens the length of the non-reception duration. Thus, the beacon reception unit 119 is configured to be able to receive the beacon signals.

When the reception duration of the beacon reception unit 119 does not overlap the transmission duration of the beacon device 200, the position detection control unit 155 may change the reception period of the beacon reception unit 119. For example, the position detection control unit 155 may change the reception period by changing the length of the reception duration to be long without changing the length of the non-reception duration at one reception period. The position detection control unit 155 may change the reception period by changing the length of the reception duration and the length of the non-reception duration at one reception period.

The HMD 100 may include an interface (not illustrated) connecting various external devices which are content supply sources. For example, the interface may be an interface corresponding to wired connection, such as a USB interface, a micro USB interface, or a memory card interface or may be configured as a wireless communication interface. In this case, external devices are image supply devices supplying images to the HMD 100 and a personal computer (PC), a mobile phone terminal, a portable game device, and the like are used. In this case, the HMD 100 can output an image or a sound based on content data input from such an external device.

Figure 8:
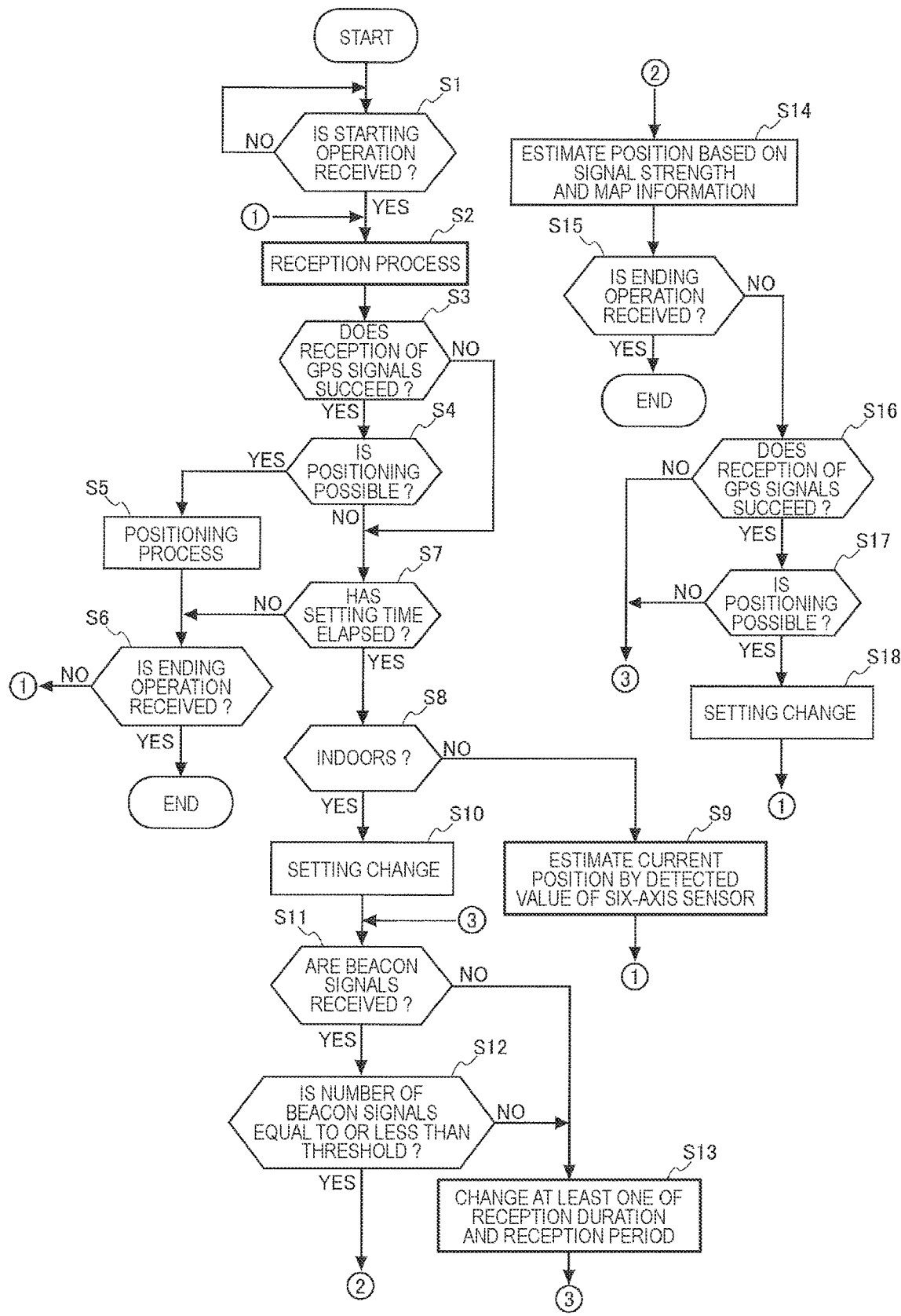
FIG. 8 is a flowchart illustrating an operation of the HMD.

FIG. 8 is a flowchart illustrating an operation of the HMD 100.

For example, the control unit 150 starts an application in response to an operation input by the user and then starts a position detection process illustrated in FIG. 8. The control unit 150 first determines whether an operation is received by the operation unit 110 (step S1). When the operation is not received (NO in step S1), the control unit 150 stands by until an operation is received. Conversely, when an operation of starting position detection is received by the operation unit 110 (YES in step S1), the control unit 150 starts a reception process of receiving the GPS signals transmitted from the GPS satellites by the GPS reception unit 115 (step S2). In the process flow, the case in which the operation of starting the position detection is received by the operation unit 110 has been described as a start trigger of the flowchart illustrated in FIG. 8, but the start trigger may be another method. For example, the start trigger of the flowchart illustrated in FIG. 8 may be a case in which an application program is activated or may be a case in which the HMD 100 is powered on. The control unit 150 may determine whether the GPS reception unit 115 succeeds in receiving the GPS signals (step S3).

When the GPS reception unit 115 does not succeed in receiving the GPS signals (NO in step S3), the control unit 150 determines whether a preset setting time has elapsed (step S7). Immediately after the reception process starts, the control unit 150 determines whether the time elapsed after the start of the reception process exceeds a setting time. When the GPS positioning is performed in step S5 to be described below, the control unit 150 determines whether the time elapsed from the previous reception of the GPS signals used for the GPS positioning exceeds the setting time. When the elapsed time does not exceed the setting time (NO in step S7), the control unit 150 determines whether an ending operation of ending the position detection is received by the operation unit 110 (step S6). When the ending operation of ending the position detection is not received (NO in step S6), the control unit 150 returns the process to the process of step S2 and the GPS reception unit 115 continuously receives the GPS signals. Conversely, when the ending operation of ending the position detecting is received (YES in step S6), the control unit 150 ends the process flow.

When the GPS reception unit 115 succeeds in receiving the GPS signals (YES in step S3), the control unit 150 determines whether the GPS positioning can be performed based on the received GPS signals (step S4). In the embodiment, the control unit 150 determines whether the GPS signals are received from the number of GPS satellites which can perform the positioning. For example, when the positioning is performed based on the received GPS signals in accordance with a generally known method, the control unit 150 determines whether the GPS positioning is possible by determining whether the GPS signals can be received from four GPS satellites. When the control unit 150 determines that the GPS positioning is not possible (NO in step S4), the control unit 150 allows the process to proceed to determination of step S7 and determines whether the setting time has elapsed (step S7). When the setting time has not elapsed (NO in step S7), the control unit 150 determines whether the ending operation is received (step S6). When the operation is not received (NO in step S6), the process returns to the process of step S2.

When the control unit 150 determines that the positioning is possible (YES in step S4), the control unit 150 performs the GPS positioning based on the received GPS signals and estimates the current position of the HMD 100 (step S5). Thereafter, the control unit 150 determines whether the ending operation is received (step S6). When the operation is not received (NO in step S6), the process returns to the process of step S2.

When the control unit 150 determines that the GPS positioning is not possible (NO in step S4) and determines that the setting time has elapsed (YES in step S7), the control unit 150 determines whether the HMD 100 is indoors (step S8).

When the number of GPS satellites which are transmission sources of the received GPS signals is equal to or less than a preset threshold and an average signal strength of the received GPS signals is equal to or less than a threshold, the control unit 150 determines that the HMD 100 is indoors (YES in step S8). When the control unit 150 determines that the HMD 100 is indoors (YES in step S8), the control unit 150 performs setting change to change the signals used to measure the current position from the GPS signals to the beacon signals (step S10).

When the number of GPS satellites which are the transmission sources of the received GPS signals is greater than the threshold or the average signal strength of the received GPS signals is greater than the threshold, the control unit 150 determines that the HMD 100 is not indoors (NO in step S8). In this case, for example, the control unit 150 estimates the current position based on the detected value detected by the six-axis sensor 111 or the magnetic sensor 113 (step S9) or corrects the current position. Thereafter, the control unit 150 returns the process to step S2 and continuously receives the GPS signals.

When the setting change is performed in step S10, the control unit 150 determines whether the beacon signals are received (step S11). When the beacon signals are received (YES in step S11), the control unit 150 determines whether the number of received beacon signals is equal to or greater than a preset threshold (step S12). For example, when 3-point positioning is performed as the positioning process for the beacon positioning, the control unit 150 determines whether the beacon signals are received from three or more beacon devices 200. When the 4-point positioning is performed as the positioning process of the beacon positioning, the control unit 150 determines whether the beacon signals are received from four or more beacon devices 200. The threshold used for the determination of step S12 can be changed in accordance with the positioning method performed by the control unit 150. As the number of beacon signals used for the beacon positioning increases, the measurement precision of the current position increases. Therefore, for example, the threshold may be changed in accordance with the measurement precision of the position detection set by the user.

Conversely, when the beacon signals are not received (NO in step S11) or the number of received beacon signals is less than the threshold (NO in step S12), the control unit 150 changes at least one of the reception duration and the reception period (step S13).

Figure 9:
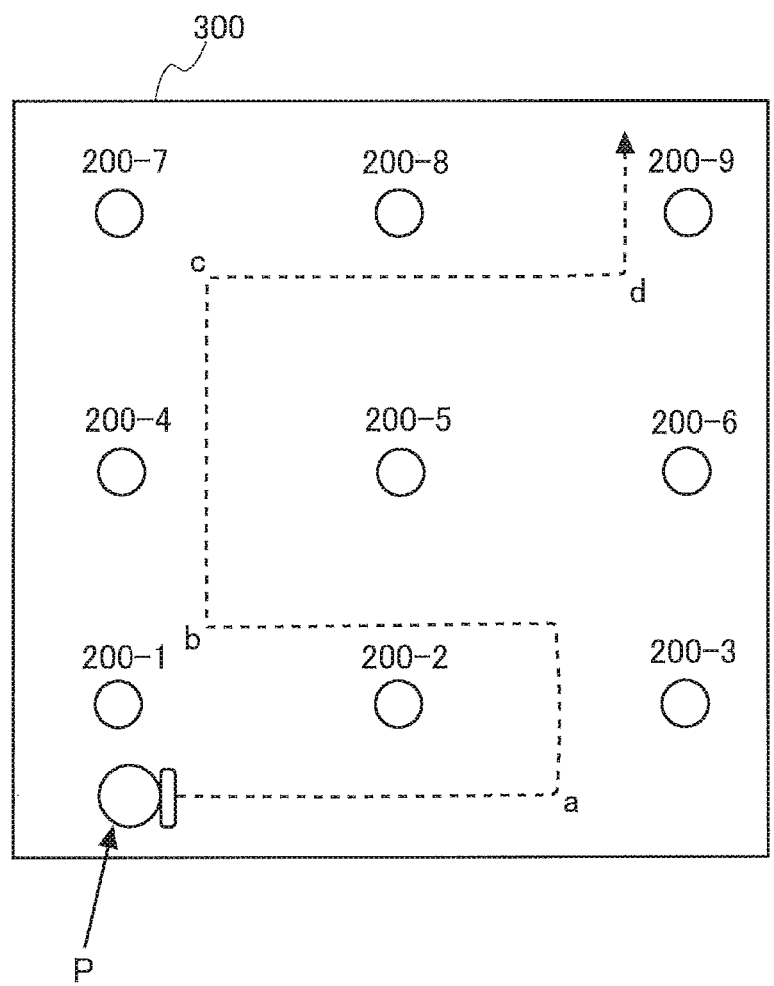
FIG. 9 is a plan view schematically illustrating a disposition example of beacon devices.

FIG. 9 is a plan view schematically illustrating disposition of the beacon devices 200 disposed on one floor 300 of a structure. More specifically, an example of the disposition of the beacon devices 200 disposed on the floor 300 and a trajectory of movement of a user P wearing the HMD 100 on the floor 300 are illustrated. The trajectory of the movement of the user P in the floor 300 is indicated by a dotted arrow. Positions a, b, c, and d disposed along the dotted line indicate positions at which positioning is performed by the HMD 100.

Figure 10:
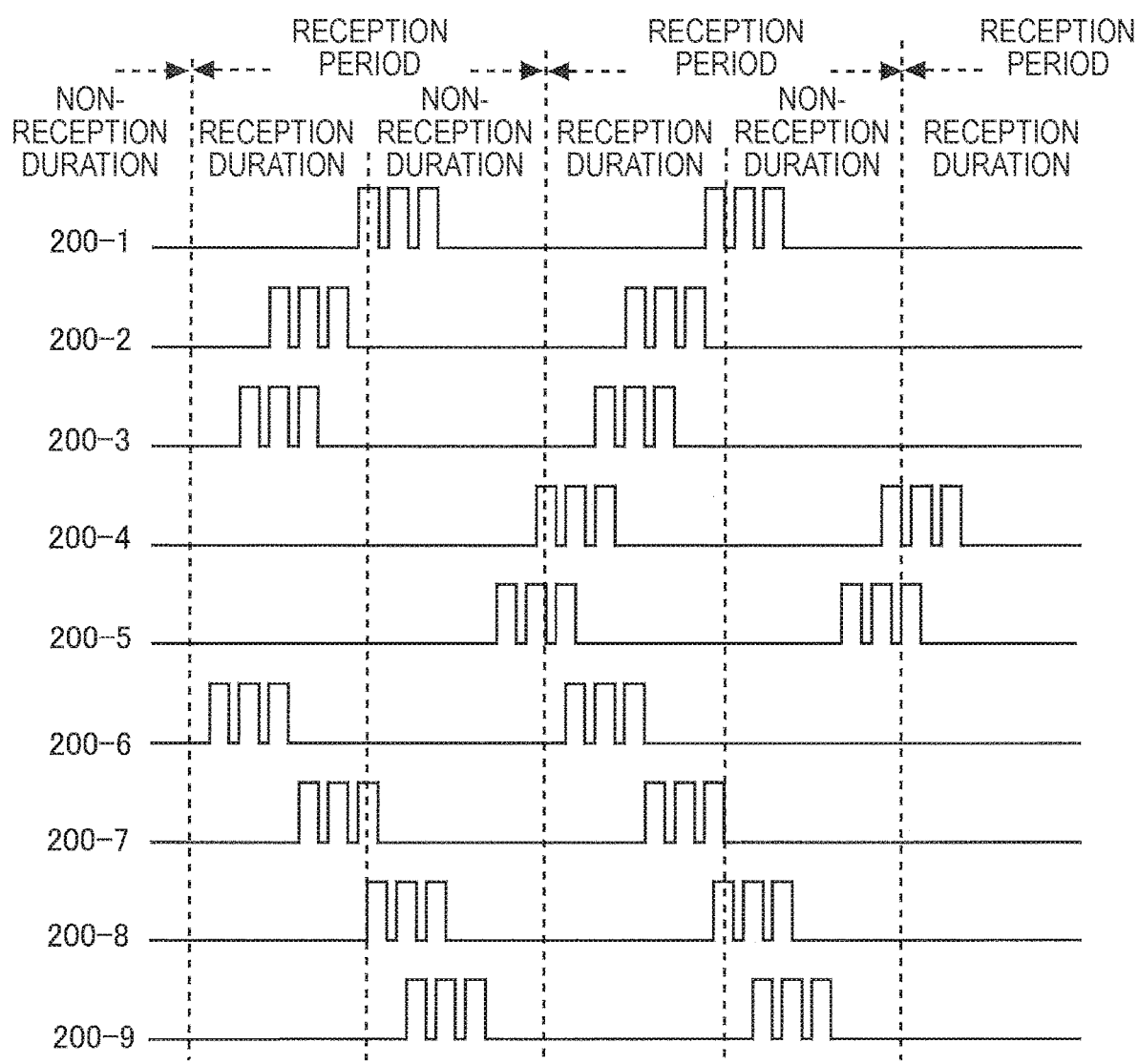
FIG. 10 is a diagram illustrating transmission timings of beacon signals and a reception period of the HMD.
Figure 11:
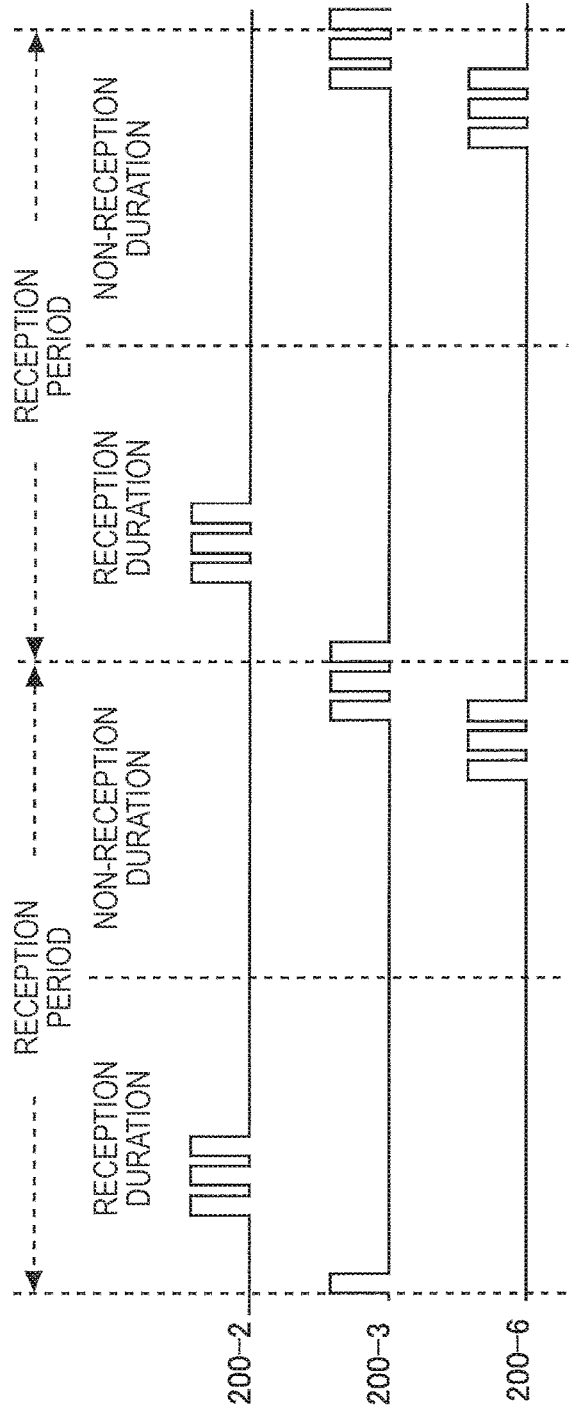
FIG. 11 is a diagram illustrating transmission timings of beacon signals and a reception period of the HMD.
Figure 12:
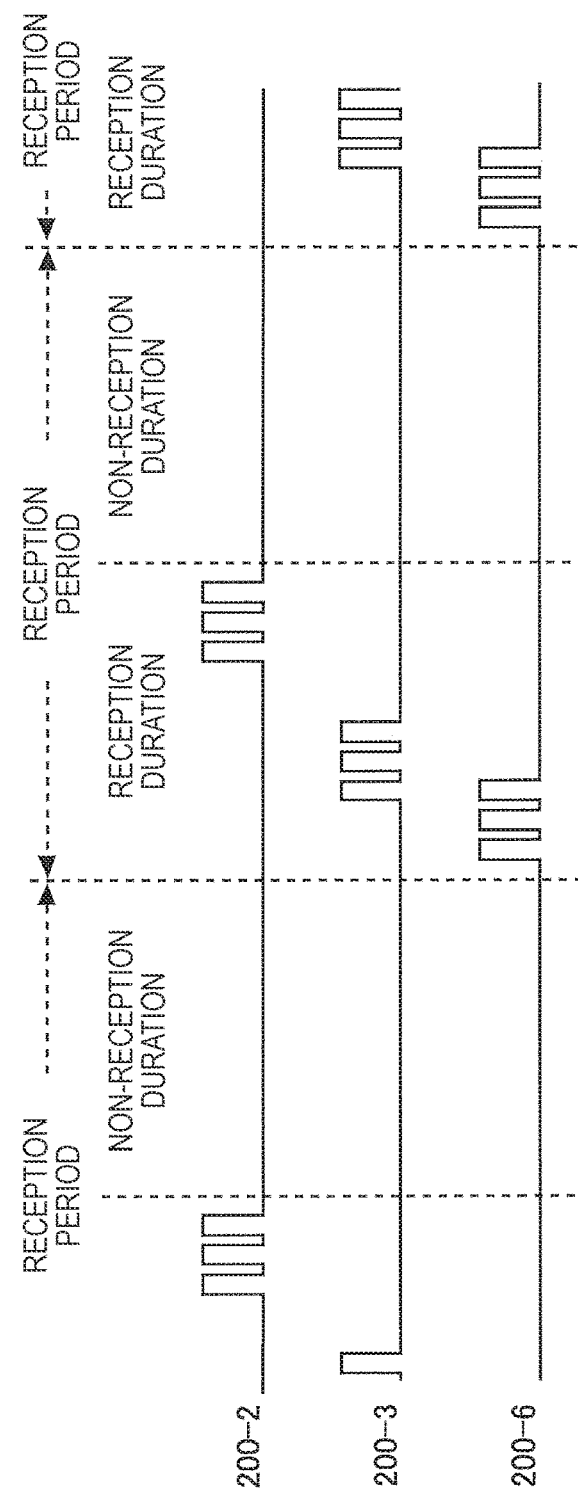
FIG. 12 is a diagram illustrating transmission timings of beacon signals and a reception period of the HMD.

FIGS. 10 to 12 are diagrams illustrating transmission timings of the beacon signals and the reception period of the HMD 100. In particular, FIG. 10 is a diagram illustrating transmission timings of the beacon devices 200-1 to 200-9 and the reception period of the beacon reception unit 119. FIG. 11 and FIG. 12 are diagrams illustrating transmission timings of the beacon signals of the beacon devices 200-2, 200-3, and 200-6 and the reception period of the beacon reception unit 119. In particular, FIG. 11 illustrates the reception period of the beacon reception unit 119 before the reception period is changed and FIG. 12 illustrates the reception period of the beacon reception unit 119 after the reception period is changed.

In the beacon devices 200-1 to 200-9 disposed on the same floor 300, the transmission timings are adjusted so that the transmission timings of the beacon signals do not overlap the transmission timings of the other beacon devices 200 disposed nearby, as illustrated in FIG. 10. In the beacon devices 200-1 to 200-9, transmission power of the beacon signals is adjusted at an arbitrary spot on the floor 300 so that the beacon signals transmitted from three or four beacon devices 200 disposed near the spot arrive.

For example, when the HMD 100 is located at a position c illustrated in FIG. 9, the transmission power of the beacon signals is adjusted so that the HMD 100 can receive the beacon signals transmitted by the beacon devices 200-4, 200-5, 200-7, and 200-8. When the HMD 100 is located at the position c, the transmission power of the beacon signals is adjusted so that the beacon signals transmitted by the beacon devices 200-1, 200-2, 200-3, 200-6, and 200-9 are not received by the HMD 100.

The plurality of beacon devices 200 disposed nearby may set the transmission durations so that the beacon signals transmitted from the beacon devices 200 can be received by the beacon reception unit 119 in one reception duration of the beacon reception unit 119. In the example illustrated in FIG. 10, when the HMD 100 is located at the position c, the transmission durations of the beacon devices 200-4, 200-5, 200-7, and 200-8 are set so that the beacon signals can be received for one reception duration of the beacon reception unit 119.

A reception operation of receiving the beacon signals in the HMD 100, for example, when the user moving on the floor 300 is located at the position a will be described.

First, the control unit 150 causes the beacon reception unit 119 to perform the reception operation at the reception period set in the beacon reception unit 119 at the time of previous positioning. In FIG. 11, the reception period of the beacon reception unit 119 set at the time of the previous positioning is illustrated.

In the case of the reception period illustrated in FIG. 11, the reception duration of the beacon reception unit 119 overlaps the transmission period of the beacon device 200-2. That is, within a duration in which the beacon reception unit 119 performs the reception operation, the beacon device 200-2 transmits the beacon signal. Therefore, the beacon reception unit 119 can receive the beacon signal transmitted by the beacon device 200-2.

The reception period of the beacon reception unit 119 partially overlaps the transmission duration of the beacon device 200-3 and does not overlap the transmission duration of the beacon device 200-6. Accordingly, the beacon reception unit 119 may fail in receiving the beacon signal transmitted by the beacon device 200-3. Alternatively, the information acquired from the beacon signal is imperfect even when the beacon signal is received. The beacon reception unit 119 may not receive the beacon signal transmitted by the beacon device 200-6.

Therefore, the control unit 150 changes the reception duration or the reception period of the beacon reception unit 119 so that the beacon signals transmitted by the beacon devices 200-2, 200-3, and 200-6 can be received. For example, the control unit 150 can change the start timing of the reception duration, the length of the reception duration, or the reception period so that the beacon signals transmitted by the beacon devices 200-2, 200-3, and 200-6 can be received.

FIG. 12 illustrates a case in which a start timing of the reception duration in which the beacon reception unit 119 performs the reception process is changed.

For example, as illustrated in FIG. 12, when the reception duration of the beacon reception unit 119 partially overlaps the transmission period of the beacon device 200-3, the beacon reception unit 119 can receive a part of the beacon signal transmitted by the beacon device 200-3 in some cases. For example, when the beacon reception unit 119 receives apart of the beacon signal transmitted by the beacon device 200-3 immediately through the reception process, the control unit 150 shifts the reception period of the beacon reception unit 119 to advance the start timing of the subsequent reception duration. Similarly, when a part of the beacon signal transmitted by the beacon device 200 is received immediately before the end of the reception duration, the control unit 150 shifts the reception period of the beacon reception unit 119 to laten the start timing of the subsequent reception duration. Thus, the control unit 150 controls the beacon reception unit 119 so that the reception duration of the beacon reception unit 119 overlaps the transmission durations of the beacon devices 200-2, 200-3, and 200-6.

The operation of the control unit 150 will be continuously described with reference to the flowchart illustrated in FIG. 8.

When at least one of the reception duration or the reception period is changed in step S13, the control unit 150 sets the changed reception duration or reception period in the beacon reception unit 119 and causes the beacon reception unit 119 to receive the beacon signals again (step S11). The control unit 150 repeats the processes of steps S11 to S13 until the number of beacon signals or more indicated by the threshold is received.

When the number of received beacon signals is equal to or greater than the number indicated by the threshold (YES in step S12) and is greater than the number of beacon signals necessary for the beacon positioning, the control unit 150 selects the beacon signals used for the beacon positioning based on the signal strength. For example, when the number of beacon signals received by the beacon reception unit 119 is 5, the control unit 150 selects the beacon signals with the signal strengths equal to or greater than a predetermined value. Subsequently, the control unit 150 determines whether the number of beacon signals with the signal strengths equal to or greater than the predetermined value is equal to or greater than 4. When the number of beacon signals with the signal strengths equal to or greater than the predetermined value is equal to or greater than 4, the control unit 150 selects four beacon signals with higher signal strengths as the beacon signals used for the beacon positioning through the 4-point positioning. When the number of beacon signals with the signal strengths equal to or greater than the predetermined value is less than 4, the control unit 150 determines whether the number of beacon signals with the signal strengths equal to or greater than the predetermined value is 3. When the number of beacon signals with the signal strengths equal to or greater than the predetermined value is 3, the control unit 150 selects the three beacon signals with the signal strengths as the beacon signals used for the beacon positioning by the 3-point positioning. When the number of beacon signals with the signal strengths equal to or greater than the predetermined value is less than the number necessary for the beacon positioning, the control unit 150 may perform the processes of steps S11 to S13 again.

Subsequently, the control unit 150 estimates the current position based on the signal strengths of the received beacon signals and the map data 125 read from the storage unit 122 (step S14).

The control unit 150 acquires the beacon IDs from the plurality of received beacon signals. Then, the control unit 150 acquires the positional information of the beacon device 200 indicated by each of the acquired beacon IDs with reference to the map data 125. The control unit 150 acquires information indicating the signal strengths of the plurality of received beacon signals. The control unit 150 estimates the current position based on the acquired information indicating the signal strengths of the beacon signals and the acquired positional information of the beacon devices 200. More specifically, the control unit 150 estimates distances from the beacon devices 200 which are the transmission sources of the received beacon signals based on the signal strengths of the acquired beacon signals. The control unit 150 estimates the current position of the HMD 100 based on the estimated distance and the positional information of each beacon device 200.

The beacon reception unit 119 may be installed in the display unit 20. In this case, the control unit 150 can detect the current position more accurately by estimating or correcting the current position based on the signal strengths of the beacon signals received by the beacon reception unit 119 and the detected value of the six-axis sensor 235 or the magnetic sensor 237 of the display unit 20.

Subsequently, the control unit 150 performs various processes based on the estimated current position. For example, when a destination of route guidance is set, the control unit 150 causes the image display unit 20 to display an image indicating a travel direction based on the estimated current position. The control unit 150 specifies an object actually seen by the user based on the estimated current position or the like and causes the image display unit 20 to display an image corresponding to the specified object. For example, the control unit 150 specifies a store located in a direction of a visual line of the user based on the specified current position or the like and causes the image display unit 20 to display an image indicating information regarding the specified store.

Subsequently, the control unit 150 determines whether an ending operation of ending the position detection is received by the operation unit 110 (step S15). When the ending operation of ending the position detection is not received (NO in step S15), the control unit 150 allows the process to proceed to determination of step S16. Conversely, when the ending operation of ending the position detection (YES in step S15), the control unit 150 ends the process flow.

When the ending operation of ending the position detection is not received (NO in step S15), the control unit 150 determines whether the GPS reception unit 115 succeeds in receiving the GPS signals (step S16). When the control unit 150 does not succeed in receiving the GPS signals (NO in step S16), the control unit 150 returns the process to step S11 and causes the beacon reception unit 119 to receive the beacon signals again. Conversely, when the control unit 150 succeeds in receiving the GPS signals (YES in step S16), the control unit 150 determines whether the GPS positioning is possible based on the received GPS signals (step S17). This determination is the same determination as the determination performed in step S4. When the control unit 150 determines that the GPS positioning is not possible (NO in step S17), the control unit 150 returns the process to step S11 and causes the beacon reception unit 119 to receive the beacon signals again. Conversely, when the control unit 150 determines that the GPS positioning is possible (YES in step S17), the control unit 150 performs the setting change (step S18). That is, the control unit 150 performs the setting change to change the signals used to measure the current position from the beacon signals to the GPS signals (step S18). Thereafter, the control unit 150 allows the process to proceed to step S2.

In the process flow illustrated in FIG. 8, the control unit 150 selects the beacon signals used for the beacon positioning based on the signal strengths of the received beacon signals when the plurality of beacon signals are received. The control unit 150 may use the positional information of the beacon devices 200 as information used to select the beacon signals.

For example, the control unit 150 acquires the beacon IDs from the received beacon signals and acquires the positional information of the beacon devices 200 which are the transmission sources (information regarding the transmission sources) based on the acquired beacon IDs with reference to the map data 125. The control unit 150 specifies the beacon device 200 which is the transmission source of the beacon signal with the largest signal strength. This beacon device 200 is referred to as a first beacon device 200. The control unit 150 specifies the beacon device 200 with the signal strength equal to or greater than the predetermined value within a distance from the specified first beacon device 200 which is less than a predetermined value. The specified beacon device 200 is referred to as a second beacon device 200. The control unit 150 selects the beacon signal transmitted from the first beacon device 200 and the beacon signal transmitted from the second beacon device 200 as the beacon signals used for the beacon positioning.

When the unreceivable beacon signal is included in the reception duration or the reception period changed in step S13, the control unit 150 may select the beacon signal to be excluded from the beacon signals received in step S11. For example, the control unit 150 selects the beacon signal to be excluded from the beacon signals received by the beacon reception unit 119 based on the signal strengths of the beacon signals. For example, the control unit 150 selects the beacon signal with the smallest signal strength as the beacon signal to be excluded. When the control unit 150 selects the beacon signal to be excluded, the control unit 150 resets the reception duration or the reception period based on the transmission timings of the beacon signals from which the selected beacon signal to be excluded is excluded. Therefore, it is possible to reduce the possibility of the reception of the selected beacon signal failing.

In the above-described process flow, the current position calculated through the GPS positioning is corrected based on the detected value detected by the six-axis sensor 111 or the magnetic sensor 113 in step S9. Additionally, in step S14, the current position calculated through the beacon positioning may be corrected based on the detected value detected by the six-axis sensor 111 or the magnetic sensor 113.

As described above, the HMD 100 according to the first embodiment to which the invention is applied includes the beacon reception unit 119 that intermittently receives the beacon signals and the control unit 150 that controls the reception period of the beacon reception unit 119. The control unit 150 changes the reception period of the beacon reception unit 119 to correspond to the reception state of the beacon signals received by the beacon reception unit 119.

In the HMD 100 to which the reception device, the display device, the program, and the method of controlling the reception device according to the embodiment are applied, it is possible to achieve an improvement in the reception state of the beacon signals by changing the reception period of the beacon signals and it is possible to increase a probability that the beacon signals are captured. Thus, it is possible to reduce power consumption necessary for reception of the HMD 100.

The control unit 150 selects the beacon signals based on the signal strengths (reception strengths) of the beacon signals received by the beacon reception units 119 and changes the reception period of the beacon reception unit 119 in accordance with the transmission timings of the selected beacon signals. Thus, it is possible to increase the probability that the selected beacon signals are captured and it is possible to reduce the power consumption necessary to receive the beacon signals.

The control unit 150 shifts the reception period of the beacon reception units 119 in accordance with the transmission timings of the selected beacon signals.

Accordingly, it is possible to change the reception period of the beacon reception units 119 in accordance with the transmission timing of the selected beacon signal and cause the beacon reception units 119 to receive the selected beacon signal.

The control unit 150 sets the reception duration in which the beacon reception units 119 is caused to perform the operation of receiving the beacon signals and the non-reception period in which the beacon reception units 119 are caused not to perform the operation of receiving the beacon signals. The control unit 150 changes the duty ratio between the reception duration and the non-reception duration at the reception period in accordance with the transmission timing of the selected beacon signal. The control unit 150 changes the length of the reception duration in accordance with the transmission timing of the selected beacon signal.

Accordingly, it is possible to change the duty ratio between the reception period and the non-reception period or the length of the reception period and cause the beacon reception units 119 to receive the selected beacon signal.

When the plurality of beacon signals are received, the control unit 150 selects the preset number of beacon signals based on the signal strengths of the plurality of received beacon signals and changes the reception period of the beacon reception units 119 in accordance with the transmission timings of the selected beacon signals.

Accordingly, it is possible to cause the beacon reception units 119 to receive the beacon signals selected based on the signal strengths.

The control unit 150 acquires the information regarding the transmission sources of the beacon signals from the plurality of beacon signals and selects the preset number of beacon signals based on the signal strengths of the plurality of received beacon signals and the information regarding the transmission sources of the plurality of beacon signals.

Accordingly, it is possible to cause the beacon reception units 119 to receive the beacon signals selected based on the signal strengths of the beacon signals and the information regarding the transmission sources of the beacon signals. For example, by using the positional information of the beacon devices 200 as the information regarding the transmission sources, it is possible to cause the beacon reception units 119 to receive the beacon signals with the large signal strengths transmitted from the beacon devices 200 located near the HMD 100.

The control unit 150 selects the beacon signal excluded from the selected beacon signals based on the signal strengths when the selected beacon signals include the beacon signal unreceivable at the changed reception period. The control unit 150 resets the reception period in accordance with the transmission timings of the beacon signals from which the selected beacon signal to be excluded is excluded.

Accordingly, when there is the beacon signal unreceivable at the set reception period, the beacon signals received based on the signal strengths are reselected and the reception period is reset so that the selected beacon signals can be received. Therefore, it is possible to reduce the possibility of the reception of the selected beacon signals failing.

The control unit 150 estimates the position of the HMD 100 based on the signal strengths of the beacon signals received by the beacon reception units 119.

Accordingly, it is possible to estimate the current position of the HMD 100 with high precision.

The HMD 100 includes the storage unit 122 that stores the positional information indicating the positions of the beacon devices 200 transmitting the beacon signals in association with the beacon IDs of the beacon devices 200. The control unit 150 acquires the beacon IDs indicating the transmission sources of the beacon signals from the plurality of beacon signals received by the beacon reception units 119. Then, the control unit 150 estimates the position of the HMD 100 based on the reception strengths of the plurality of beacon signals and the positional information of the beacon devices 200 acquired from the storage unit 122 based on the beacon IDs.

Accordingly, it is possible to improve the estimation precision of the HMD 100.

The control unit 150 selects the beacon signals comparing the signal strengths of the plurality of received beacon signals to the threshold and estimates the position of the reception device by 3-point positioning when the number of selected beacon signals is 3. When the number of selected beacon signals is equal to or greater than 4, the control unit 150 estimates the position of the HMD 100 by 4-point positioning. When the number of selected beacon signals is less than 3, the control unit 150 resets the reception period.

Accordingly, it is possible to perform the positioning process to correspond to the number of received beacon signals. Therefore, when the number of received beacon signals is large, it is possible to improve estimation precision of the current position of the HMD 100. When the number of received beacon signals is small, it is possible to reset the reception period and cause the beacon reception units 119 to receive the beacon signals again.

The HMD 100 includes the six-axis sensor 111 and the magnetic sensor 113. The control unit 150 corrects the estimated current position of the HMD 100 based on a detected value detected by at least one of the six-axis sensor 111 and the magnetic sensor 113.

Accordingly, it is possible to improve the estimation precision of the current position of the HMD 100.

The beacon signals received by the beacon reception unit 119 are radio beacon signals or signals based on a Bluetooth (registered trademark) Low Energy communication standard.

Accordingly, the HMD 100 can have a simple configuration and it is possible to reduce power consumption of the HMD 100.

Figure 13:
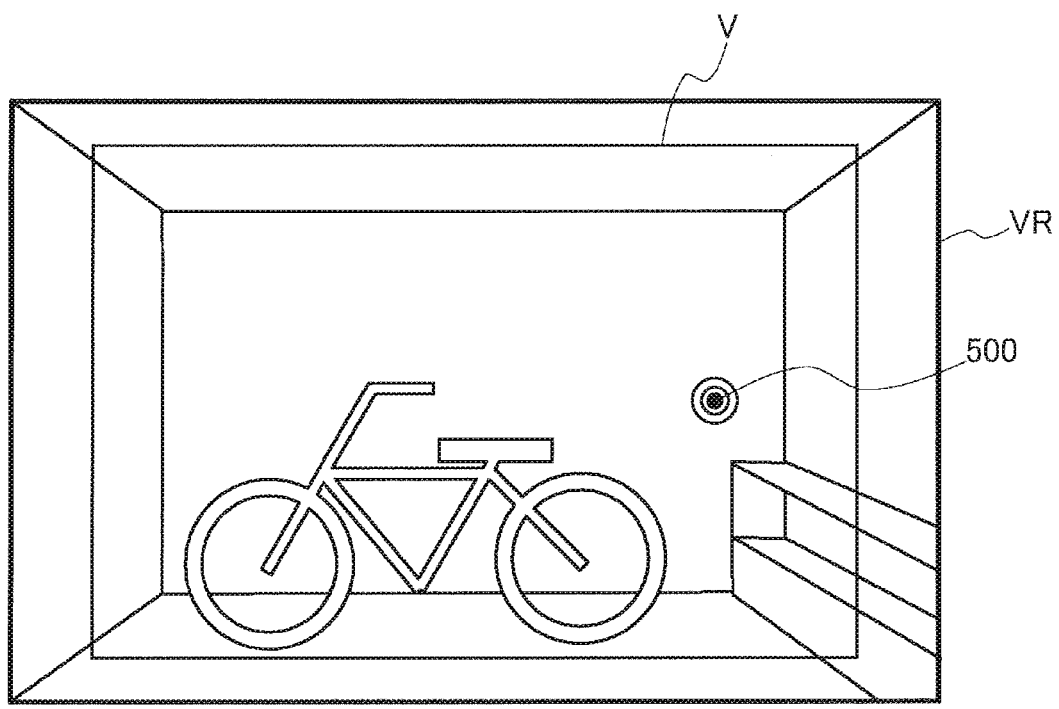
FIG. 13 is a diagram illustrating an example of AR display of an image indicating a strength and a direction of a transmission source of a beacon signal.

When a presence direction of the beacon device 200 is estimated from the reception strength of the beacon signal, the HMD 100 may display the estimated position so that the estimated position is overlapped as a display marker on the outside scenery. When the current position is estimated, the HMD 100 visually displays the presence direction of the beacon device 200 and the strength setting the HMD 100 as a center (reference). FIG. 13 illustrates an example in which an image 500 indicating the presence direction of the beacon device 200 and the strength is displayed by augmented reality (AR). In FIG. 13, the presence direction of the beacon device 200 is indicated by the display position of the image 500 in a display region V. The size of the image 500 indicates a reception strength of the beacon signal. The wearer of the HMD 100 can recognize the position of the beacon device 200 by displaying the image 500.

In FIG. 13, VR indicates a field of view of the user. In FIG. 13, V indicates a range in which an image is viewed by the half mirrors 261 and 262 in the field of view VR, that is, a display region.

Figure 14:
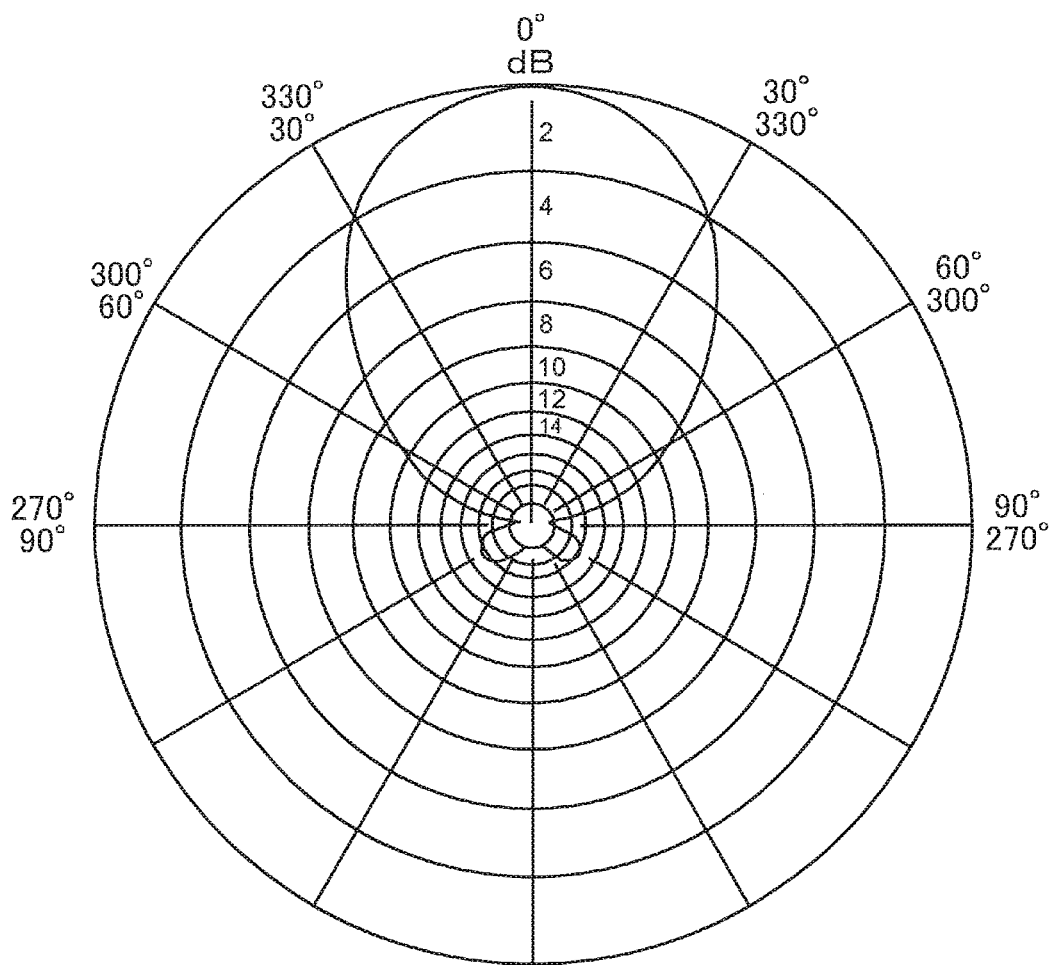
FIG. 14 is a diagram illustrating a radar map indicating a reception strength of a beacon signal.

FIG. 14 illustrates a radar map indicating the reception strength of the beacon signal.

The HMD 100 generates the radar map indicating the reception strength of the beacon signal received by the beacon reception unit 119 and displays the generated radar map to be overlapped on the outside scenery. When the radar map is displayed, the wearer of the HMD 100 can determine where the beacon device 200 is located. In FIG. 14, only the reception strength of one beacon signal is illustrated, but a radar map indicating the reception strengths of the plurality of beacon signals may be displayed.

When the reception strength of the beacon signal received by the beacon reception unit 119 is less than the preset threshold, the HMD 100 may cause the image display unit 20 to display a message "Please come closer to the beacon device 200". The HMD 100 may cause the image display unit 20 to display a message "Please direct the beacon reception unit 119 in the direction of the beacon device 200". Thus, it is possible to alert the wearer of the HMD 100. By approaching the wearer of the HMD 100 close to the beacon device 200 or direct the beacon reception unit 119 in the direction of the beacon device 200, it is possible to reduce power necessary for communication and reduce power consumption of the HMD 100.

In the above-described embodiment, the current position of the HMD 100 is estimated based on the direction in which the radio waves of the beacon signals are received, the change in the radio wave strengths when the wearer of the HMD 100 moves, or the detected value of the six-axis sensor 235 or the magnetic sensor 237 mounted on the HMD 100. Additionally, the HMD 100 may use a captured image of the camera 61 in order for the wearer of the HMD 100 to recognize the position of the beacon device 200. For example, the HMD 100 is caused to store images of the beacon devices 200 in advance and specify the beacon devices 200 from the captured images of the camera 61. The HMD 100 may cause the image display unit 20 to display the images of the specified beacon devices 200 in association with reception strengths of the beacon signals received from the specified beacon devices 200.

In the embodiment, the configuration has been exemplified in which the plurality of beacon devices 200 (for example, the beacon devices 200-1 to 200-N in FIG. 1) transmit the beacon signals with the same frequency band, but the mode for carrying out the invention is not limited thereto. A configuration may be realized in which the plurality of beacon devices 200 transmitting beacon signals with different frequency bands are located in a range in which the beacon signals can be received by the HMD 100. For example, a configuration may be realized in which the beacon device 200 transmitting a beacon signal with a 2.4 GHz band and the beacon device 200 transmitting a beacon signal with a 5 GHz band are installed in a range in which the beacon signals can arrive.

In this case, the beacon reception unit 119 may be configured to be able to receive radio signals at a plurality of frequency bands, select one frequency band, and receive a beacon signal with the selected frequency band. Alternatively, the beacon reception unit 119 may receive the beacon signals at the plurality of frequency bands. In this case, the operations described with reference to FIGS. 8 to 13 may be performed at each frequency band. For example, the reception period and/or the duty ratio between the reception period and the non-reception period of the beacon reception unit 119 may be adjusted or changed at each frequency band. In the operation of performing positioning based on the beacon signals received from the plurality of beacon devices 200, the positioning may be performed using the plurality of beacon signals received at the different frequency bands.

The same applies to a transmission scheme (a modulation scheme, encryption, or the like) when the plurality of beacon devices 200 (for example, the beacon devices 200-1 to 200-N in FIG. 1) transmit the beacon signals. That is, the beacon reception unit 119 may receive the plurality of beacon signals transmitted in conformity to different transmission schemes to correspond to the plurality of transmission schemes of the beacon signals or may selectively receive the beacon signals transmitted in conformity to one transmission scheme. For example, the reception period and/or the duty ratio between the reception period and the non-reception period of the beacon reception unit 119 may be adjusted or changed at each transmission scheme. In the operation of performing positioning based on the beacon signals received from the plurality of beacon devices 200, the positioning may be performed using the plurality of beacon signals transmitted in conformity to the different transmission schemes.

Second Embodiment

Next, a second embodiment to which the invention is applied will be described. In the second embodiment, in an HMD 100, a reception period at which beacon signals are received, a duty ratio between a reception duration and a non-reception duration, or the like is changed based on content of the beacon signals transmitted by beacon devices 200.

In the second embodiment, the configurations of the HMD 100 and the beacon device 200 have been described in the first embodiment.

In the second embodiment, the beacon signal transmitted by the beacon device 200 includes information other than the beacon ID and has, for example, the configuration indicated by the beacon signal 2B or 2C in FIG. 2. As will be described below, when the HMD 100 is configured such that the beacon IDs and attributes of the beacon devices 200 are associated in the map data 125 (see FIG. 7) or a table (not illustrated), an operation according to the second embodiment can be realized using the beacon signal 2A.

Figure 15:
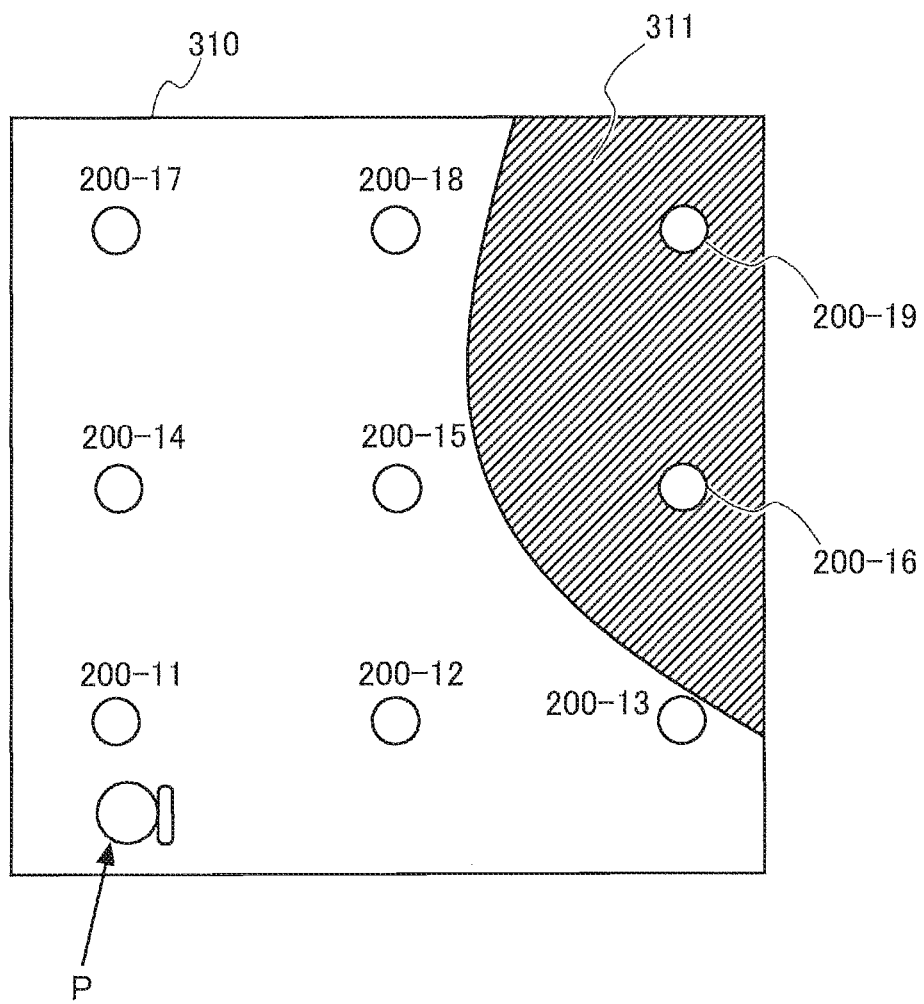
FIG. 15 is a plan view schematically illustrating a disposition example of beacon devices according to a second embodiment.

FIG. 15 is a plan view schematically illustrating a disposition example of the beacon devices 200.

In the example of FIG. 15, a plurality of beacon devices 200 are disposed in a target region 310 in which a user P wearing the HMD 100 can act. The target region 310 includes a specific region 311 set as a region which the user P is not allowed to enter and the plurality of beacon devices 200 are disposed outside of the specific region 311. In the example of FIG. 15, the beacon devices 200 are also disposed inside the specific region 311. Any of the beacon devices 200 may be installed in a boundary of the inside and the outside of the specific region 311.

The specific region 311 may be a region necessarily distinguished or a region preferably distinguished from other regions in the target region 310 and may be indoors or outdoors. As the specific region 311, for example, a region in which the user P is not allowed to enter, such as a construction site, seashore, and a zone in which high-voltage equipment is installed, can be exemplified. For example, the specific region 311 may be an event site or a place in which a specific service is provided. Specifically, when an event in a game is associated with positional information in the game played by the user P wearing the HMD 100 using the HMD 100 or another electronic device, a position of an actual space associated with an event may be the specific region 311. The target region 310 may include a region which is the specific region 311 and a region other than the specific region 311 and to which the user P can move.

In the example illustrated in FIG. 15, nine beacon devices 200-11 to 200-19 are installed in the target region 310. Of the beacon devices 200, the beacon device 200-16 and the beacon device 200-19 are located in the specific region 311.

Transmission timings at which the beacon devices 200-11 to 200-19 transmit beacon signals and transmission power of the beacon signals are adjusted or controlled as in the beacon devices 200-1 to 200-9 described with reference to FIGS. 10 to 12.

The beacon signals transmitted by the beacon devices 200-16 and 200-19 located inside the specific region 311 include a fixed value indicating that the positions of the transmission sources are inside the specific region 311.

The beacon signals transmitted by the beacon devices 200-11 to 200-15 and the beacon devices 200-17 and 200-18 located outside of the specific region 311 do not include the fixed value indicating that the positions of the transmission sources are inside the specific region 311. Alternatively, the beacon signals may also include a fixed value indicating that the positions of the transmission sources are outside of the specific region 311. The beacon signals transmitted by the beacon devices 200-13, 200-15, and 200-18 located outside of the specific region 311 and at positions close to the specific region 311 may include a fixed value indicating that the positions of the transmission sources are close to the specific region 311.

When the beacon signals transmitted by the beacon devices 200 are received, the HMD 100 worn by the user moving the target region 310 specifies the positions of the beacon devices 200 of the transmission sources based on the fixed values included in the received beacon signals. Specifically, the fixed values included in the received beacon signals are acquired and whether there is the value indicating that the positions of the transmission sources are inside the specific region 311 is determined. Here, whether there is a value indicating that the positions of the transmission sources are close to the specific region 311 may be determined as well.

When the beacon signals include the value indicating that the positions of the transmission sources are inside the specific region 311 or the value indicating that the positions of the transmission sources are close to the specific region 311, the HMD 100 changes reception conditions of the beacon signals so that a reception probability of the beacon signals increases. That is, the HMD 100 changes at least one of the reception duration and the reception period of the beacon signals. For example, the control unit 150 changes the start timing of the reception duration, the length of the reception duration, the reception period, or the like.

When the reception conditions are changed, the HMD 100 enters a state in which the beacon signals can be received from more beacon devices 200. The HMD 100 may change the reception conditions so that the beacon signals including the value indicating that the positions of the transmission sources are inside the specific region 311 or the value indicating that the positions of the transmission sources are close to the specific region 311 can be received at a higher probability. Specifically, the reception conditions suitable for receiving the beacon signals transmitted by the beacon devices 200-16 and 19 may be set. Alternatively, the reception conditions suitable for receiving the beacon signals transmitted by the beacon devices 200-13, 15, and 18 may be set.

Figure 16:
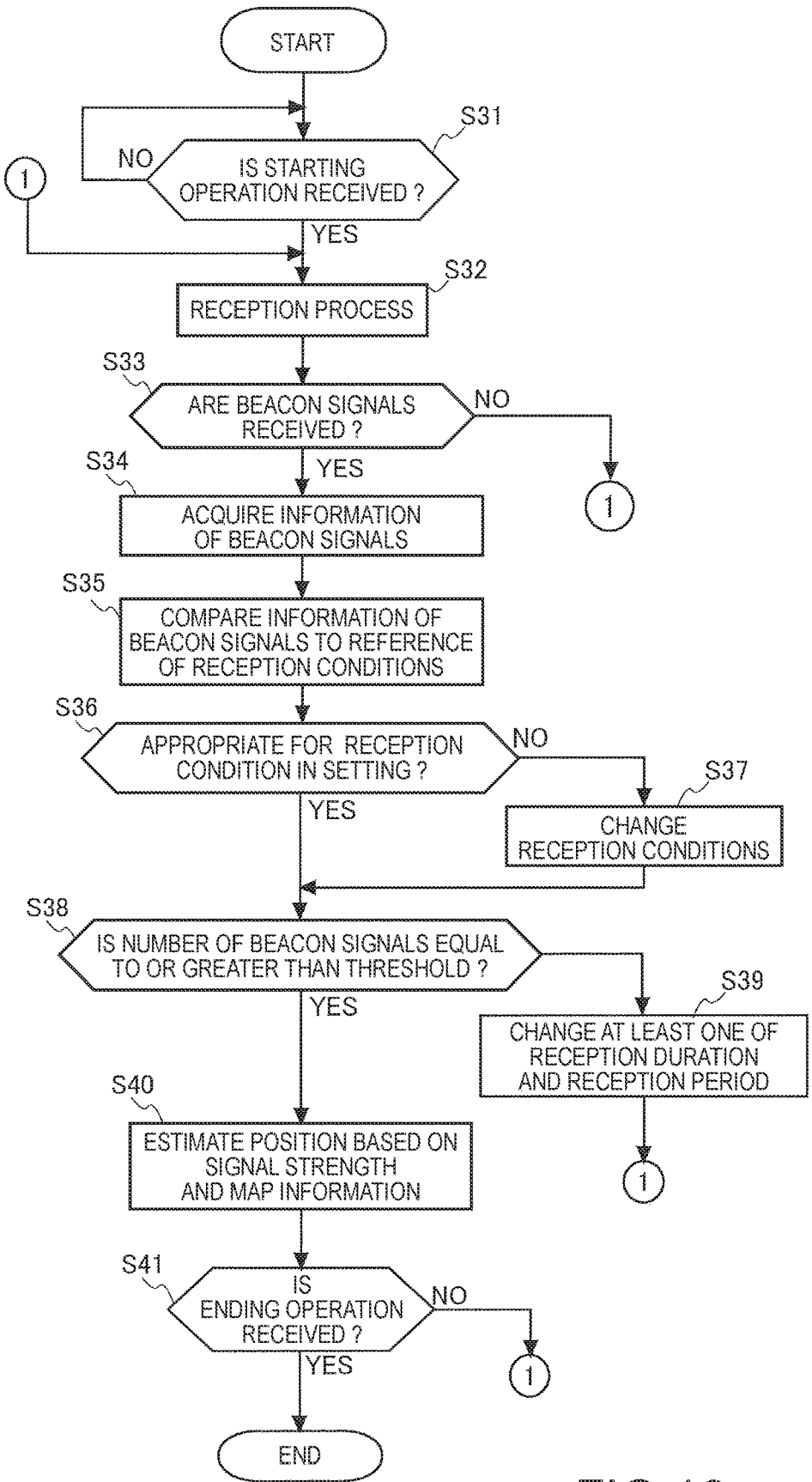
FIG. 16 is a flowchart illustrating an operation of an HMD according to the second embodiment.

FIG. 16 is a flowchart illustrating an operation of the HMD 100 according to the second embodiment.

FIG. 16 illustrates a series of operations of receiving the beacon signals and performing position detection. For example, the control unit 150 starts the operation of FIG. 16 after an application starts in response to an operation input by the user.

The control unit 150 determines whether an operation is received by the operation unit 110 (step S31). When the operation is not received (NO in step S31), the control unit 150 stands by until an operation is received.

When the control unit 150 determines that an operation of starting position detection is received by the operation unit 110 (YES in step S31), the control unit 150 causes the beacon reception unit 119 to receive the beacon signals (step S32).

The control unit 150 determines whether the beacon signals are received (step S33). When the beacon signals are received (YES in step S33), the control unit 150 acquires the information included in the received beacon signals (step S34). For example, the control unit 150 acquires the information included as the fixed value in the beacon signals. The information may be acquired in accordance with the beacon IDs.

The control unit 150 compares the information acquired from the beacon signals to a reference of currently set reception conditions (step S35). The reception conditions include the reception period, the duty ratio and the length of the reception duration at the reception period, and reception timings. In the HMD 100, the reception conditions can be selected and set among the plurality of reception conditions and each of the reception conditions is included in, for example, the setting data 123. A case in which the reception conditions are set is set in association with each of the reception conditions. For example, the HMD 100 moving the target region 310 illustrated in FIG. 15 has a reception condition suitable for a case in which the user P retreats from the specific region 311 (a first reception condition) and a reception condition suitable for a case in which the user P approaches the specific region 311 (a second reception condition). More specifically, the case in which the first reception condition is set is a case in which the positions of the beacon devices 200 of the transmission sources of the beacon signals are not inside or near the specific region 311. The case in which the second reception condition is set is a case in which the positions of the beacon devices 200 of the transmission sources of the beacon signals are inside or near the specific region 311. The control unit 150 compares the information acquired in step S34 to the case suitable for the currently set reception condition.

The control unit 150 determines whether the information acquired in step S34 is suitable for the case suitable for the currently set reception condition (step S36). When the information is not suitable for the reception condition (NO in step S36), the control unit 150 changes the reception condition (step S37). After the reception condition is changed in step S37 and when the beacon signals are not received (NO in step S33), the control unit 150 returns the process to step S32.

When the information acquired in step S34 is suitable for the case suitable for the currently set reception condition (YES in step S36), the control unit 150 determines whether the number of received beacon signals is equal to or greater than the preset threshold (step S38). For example, when the 3-point positioning is performed as the positioning process of the beacon positioning, the control unit 150 determines whether the beacon signals are received from three or more beacon devices 200. When the 4-point positioning is performed as the positioning process of the beacon positioning, the control unit 150 determines whether the beacon signals are received from four or more beacon devices 200. A threshold used for the determination of step S38 can be changed in accordance with a positioning method performed by the control unit 150. As the number of beacon signals used for the beacon positioning increases, measurement precision of the current position increases. Therefore, for example, the threshold is changed in accordance with the measurement precision of the position detection set by the user.

When the number of received beacon signals is less than the threshold (NO in step S38), the control unit 150 changes at least one of the reception duration and the reception period (step S39). After at least one of the reception duration and the reception period is changed, the control unit 150 returns the process to step S32 and causes the beacon reception unit 119 to receive the beacon signals again (step S32). Until the beacon signals equal to or greater than a number indicated by the threshold are received, the control unit 150 repeats the processes of steps S32 to S39.

When the number of received beacon signals is equal to or greater than the number indicated by the threshold (YES in step S38) and is greater than the number of beacon signals necessary for the beacon positioning, the control unit 150 performs a process of estimating the position based on the signal strength (step S40). Specifically, the control unit 150 selects the beacon signals used for the beacon positioning from the received beacon signals. For example, when the number of beacon signals received by the beacon reception unit 119 is 5, the control unit 150 selects the beacon signals with signal strengths equal to or greater than a predetermined value. Next, the control unit 150 determines whether the number of beacon signals with the signal strengths equal to or greater than the predetermined value is equal to or greater than 4. When the number of beacon signals with the signal strengths equal to or greater than the predetermined value is equal to or greater than 4, the control unit 150 selects four beacon signals with higher signal strengths as the beacon signals used for the beacon positioning by the 4-point positioning. Conversely, when the number of beacon signals with the signal strengths equal to or greater than the predetermined value is less than 4, the control unit 150 determines whether the number of beacon signals with the signal strengths equal to or greater than the predetermined value is 3. When the number of beacon signals with the signal strengths equal to or greater than the predetermined value is 3, the control unit 150 selects the three beacon signals with the signal strengths as the beacon signals used for the beacon positioning by the 3-point positioning.

Further, the control unit 150 estimates the current position based on the signal strengths of the selected beacon signals and the map data 125 read from the storage unit 122. Here, the control unit 150 acquires the beacon IDs from the plurality of received beacon signals. The control unit 150 acquires positional information of the beacon devices 200 indicated by the acquired beacon IDs with reference to the map data 125. The control unit 150 acquires information indicating the signal strengths of the plurality of received beacon signals. The control unit 150 estimates the current position based on the information indicating the acquired signal strengths of the beacon signals and the acquired positional information of the beacon devices 200. More specifically, the control unit 150 estimates distances from the beacon devices 200 which are the transmission sources of the received beacon signals based on the signal strengths of the acquired beacon signals. The control unit 150 estimates the current position of the HMD 100 based on the estimated distances and the positional information of the beacon devices 200.

Here, the control unit 150 may perform various processes based on the estimated current position. For example, as described in the first embodiment, the image display unit 20 may be caused to display the image indicating a traveling direction based on the estimated current position. An object or the like which the user actually sees may be specified based on the estimated current position or the like and the image display unit 20 may be caused to display an image corresponding to the specified object.

The control unit 150 determines whether an ending operation of ending the position detection is received by the operation unit 110 (step S41). When the ending operation of ending the position detection is not received (NO in step S41), the control unit 150 returns the process to step S32. Conversely, when the ending operation of ending the position detection is received (YES in step S41), the control unit 150 ends the operation of FIG. 16.

When the starting operation of starting the position detection is received by the operation unit 110, the start trigger of the flowchart illustrated in FIG. 16 has been described as a trigger, but the start trigger may be set in accordance with another method. For example, the fact that an application program is activated or the fact that the HMD 100 is powered on may be set as a start trigger.

In the foregoing process, the control unit 150 may cause the image display unit 20 to display an image or text alerting the user when the positions of the beacon devices 200 which are the transmission sources of the beacon signals are inside or near the specific region 311. At this time, a sound may be output.

In the map data 125, the beacon ID of each beacon device 200 may be associated with the position of each beacon device 200 which is inside or near the specific region 311. In this case, the information acquired by the control unit 150 in step S34 may be only the beacon ID. That is, the signals transmitted by the beacon devices 200 may be in the mode of the beacon signal 2A (see FIG. 2).

The information acquired by the control unit 150 in step S34 may be a variable value included in the beacon signal. In this case, the beacon device 200 may detect whether the position of the beacon device 200 (the self-beacon device) is inside or near the specific region 311 and may include a detection result as a variable value in the beacon signal and transmit the beacon signal. This configuration is effective, for example, when the specific region 311 is not fixed. That is, even when the position of each beacon device 200 can be specified in accordance with the map data 125, a relative positional relation between the position of each beacon device 200 and the specific region 311 varies (is changed) in some cases. In this case, it is difficult to specify the positional relation with the specific region 311 using the beacon ID or the fixed value. By causing each beacon device 200 to transmit the beacon signal including the positional relation with the specific region 311 as the variable value, the control unit 150 can specify a relation among the specific region 311, the beacon device 200, and the beacon signal even when the position of the specific region 311 is changed.

In this way, according to the second embodiment to which the invention is applied, the control unit 150 changes the reception period of the beacon reception unit 119 based on information included in the beacon signal received by the beacon reception unit 119 or information indicated by the beacon signal. Therefore, the reception period of the beacon signals can be changed based on the information included in the beacon signals received by the beacon reception unit 119 or the information indicated by the beacon signals. Accordingly, it is possible to change the reception period of the beacon signals based on content of the information transmitted as the beacon signals and, for example, to optimize the reception period to correspond to importance of the information. Thus, it is possible to increase the probability that the beacon signals are captured based on the information indicated by the beacon signals and to receive the beacon signals more reliably. The information included in the beacon signals can be said to indicate the beacon ID, the fixed value, or the variable value illustrated in FIG. 2. The information indicated by the beacon signal can be said to indicate the beacon ID when the beacon IDs are the beacon signals, as in the beacon signal 2A.

The control unit 150 sets the first duration in which the beacon reception unit 119 is caused to perform the operation of receiving the beacon signals and the second duration in which the beacon reception unit 119 is caused not to perform the operation of receiving the beacon signals. Then, the control unit 150 changes the duty ratio between the first and second durations, the length of the first duration, or the reception period of the beacon reception unit 119. Therefore, the reception operation of the beacon reception unit 119 can be adjusted based on the information included in the beacon signals received by the beacon reception unit 119 or the information indicated by the beacon signals. Accordingly, it is possible to increase the probability that the beacon signals are captured based on the information indicated by the beacon signals and to receive the beacon signals more reliably.

The control unit 150 adjusts the reception operation so that the beacon signals other than the beacon signals received by the beacon reception unit 119 are received based on the information included in the beacon signals received by the beacon reception unit 119 or the information indicated by the beacon signals. Specifically, the duty ratio between the first and second durations, the length of the first duration, or the reception period of the beacon reception unit 119 is changed. Therefore, it is possible to adjust the reception operation of the beacon reception unit 119 in detail based on the information indicated by the beacon signals. Thus, it is possible to increase the probability that the beacon signals are captured and to receive the beacon signals more reliably.

Third Embodiment

Figure 17:
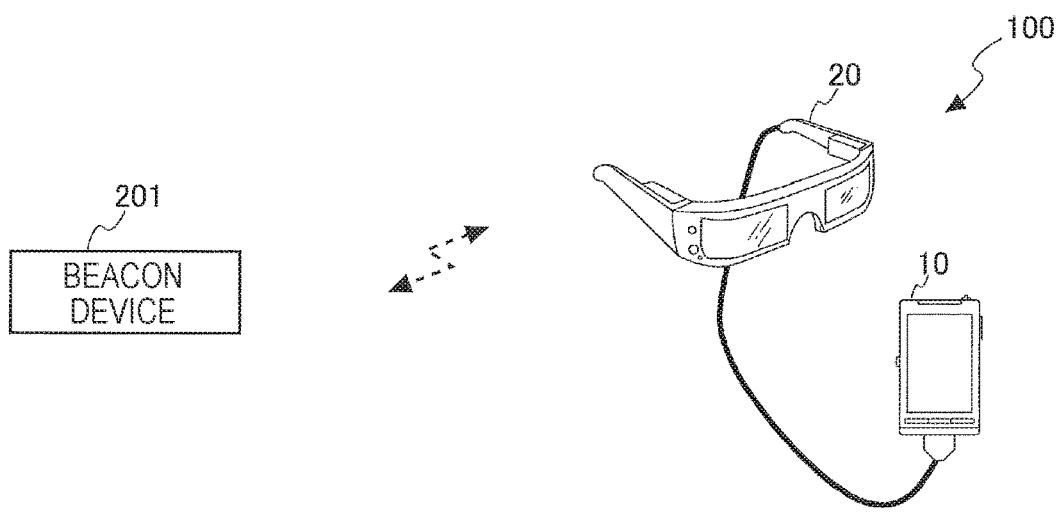
FIG. 17 is a diagram illustrating a configuration of a system according to a third embodiment.

FIG. 17 is a diagram illustrating the configuration of a system 1A according to a third embodiment to which the invention is applied. In the third embodiment, the configuration of the HMD 100 has been described in the first embodiment.

The system 1A is configured to include the HMD 100 and one beacon device 201 or a plurality of beacon devices 201. The beacon device 201 transmits a beacon signal as in the beacon device 200 and the HMD 100 receives the beacon signal transmitted by the beacon device 201. The mode of the beacon signal transmitted by the beacon device 201 is, for example, the beacon signal 2C or 2D illustrated in FIG. 2. That is, the beacon device 201 transmits a beacon signal including a variable value and the HMD 100 receives the beacon signal transmitted by the beacon device 201 to acquire the variable value.

As a specific use example of the system 1A, a biometric information detection device detecting or acquiring information regarding an organism can be exemplified as the beacon device 201. The information regarding an organism may be a respiratory rate per unit time, a pulse rate (heart rate), a body temperature, a blood pressure, a blood oxygenation level, a myogenic potential, or other vital values. The information regarding an organism may be information regarding an organism other than a vital value or may be information regarding a body motion of a user. The motion of a body motion in this case is not limited to motions of limbs or a body, but may be a motion of a part of a body, such as a voice, an eye movement, a visceral muscle, a partial skeletal muscle.

In the use method of the system 1A, for example, the beacon device 201 is mounted on the body of a user wearing the HMD 100 and information regarding the body of the user is detected by the beacon device 201. The beacon device 201 generates and transmits the beacon signal including the detected information at a preset period. The HMD 100 receives the beacon signal transmitted by the beacon device 201, extracts the information included in the received beacon signal, and stores the information. The information stored by the HMD 100 may be displayed by the image display unit 20 under the control of the control unit 150 and may be used for health management by the user. The information stored by the HMD 100 can be transmitted to an external server device via a communication line so that a health state can be managed remotely. The HMD 100 may perform a statistical process on information acquired by the beacon signal received by the beacon device 201.

Figure 18:
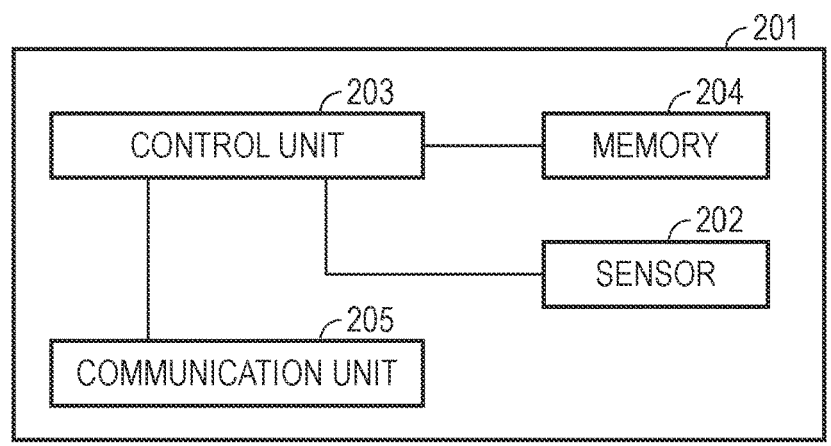
FIG. 18 is a block diagram illustrating a beacon device according to the third embodiment.

FIG. 18 is a block diagram illustrating the beacon device 201 according to the third embodiment.

The beacon device 201 includes a sensor 202 that detects a detection (measurement) target organism and a control unit 203 that controls the sensor 202 to perform detection and acquires a detected value of the sensor 202. The beacon device 201 further includes a memory 204 that stores a detected value or the like of the sensor 202 under the control of the control unit 203 and a communication unit 205 that transmits the beacon signal under the control of the control unit 203. The beacon device 201 further includes a power source (not illustrated) that is configured with a secondary battery or the like and supplies power to each unit of the beacon device 201.

The sensor 202 is a sensor that detects the above-described information regarding an organism. Specifically, a contact temperature sensor, a contactless temperature sensor measuring temperature by receiving infrared light, and a respiratory sensor detecting respiration by detecting a respiratory sound or a motion of a respiratory muscle can be exemplified. The sensor 202 may be a blood vessel sensor that measures a pulse rate or a blood oxygenation level by optically detecting a blood vessel of an organism. A blood pressure sensor detecting a blood pressure by a tonometry method, an oscillometric method, or a Riva-Rocci Korotkov method may be included. The sensor 202 may include a myogenic potential meter or may include a microphone detecting a sound. The sensor 202 may include a body motion sensor that detects a body motion by a so-called motion sensor such as a gyro sensor, an acceleration sensor, or a geomagnetic sensor.

A sampling period at which the sensor 202 performs detection is set in advance under the control of the control unit 203. The control unit 203 detects the sampling period set by the sensor 202, acquires a detected value at a preset period, and stores the detected value in the memory 204. The control unit 203 generates the beacon signal including the detected value stored in the memory 204 or a value obtained by processing the detected value as a variable value and causes the communication unit 205 in accordance with the set transmission period to transmit the beacon signal. That is, the variable value included in the beacon signal generated by the control unit 203 is a detected value of the sensor 202, a change amount of the detected value of the sensor 202, or a processed value obtained by statistically processing the detected value of the sensor 202.

Figure 19:
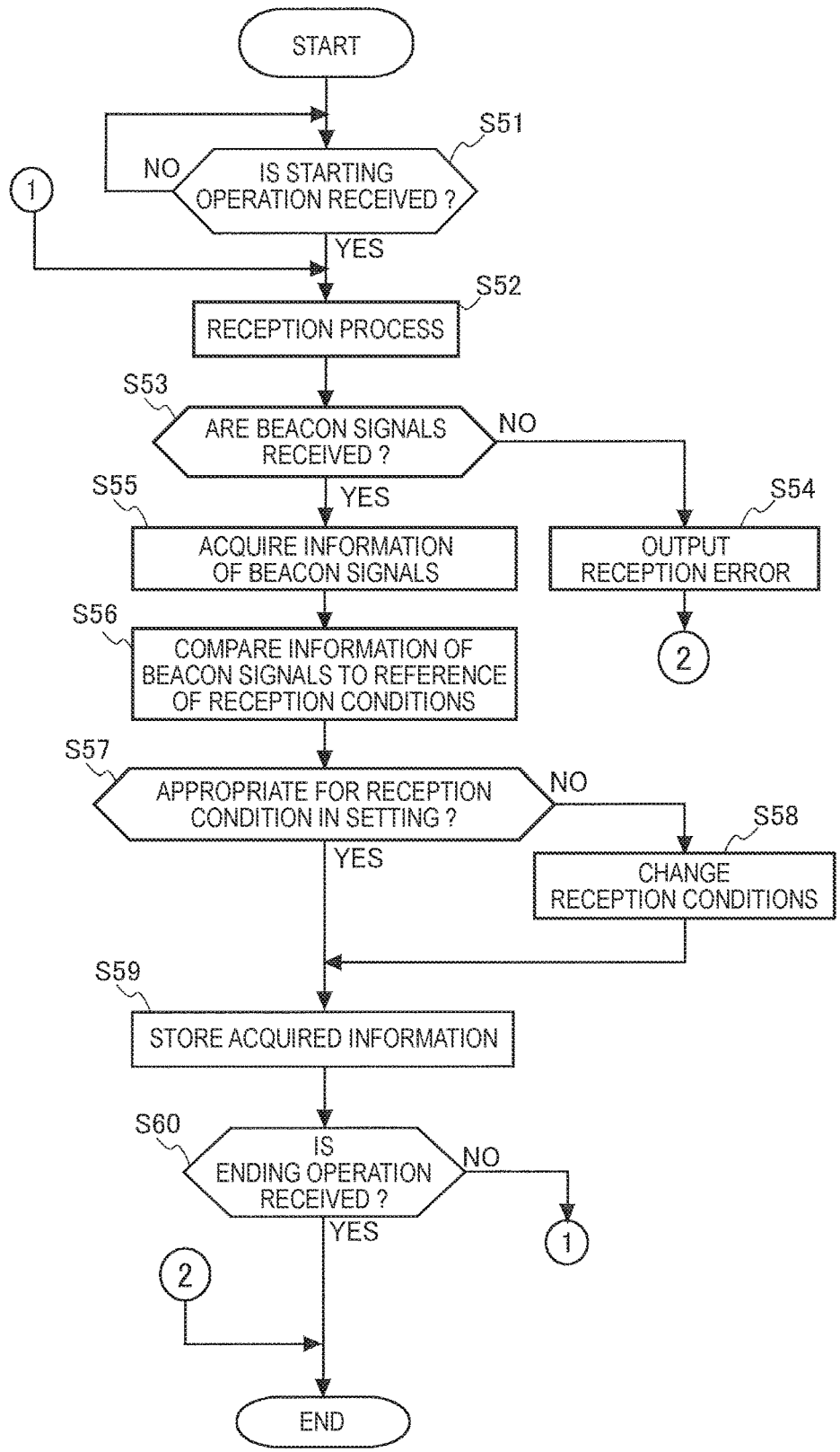
FIG. 19 is a flowchart illustrating an operation of an HMD according to the third embodiment.

FIG. 19 is a flowchart illustrating an operation of the HMD 100 according to the third embodiment.

For example, the control unit 150 starts the operation of FIG. 19 after an application starts in response to an operation input by the user.

The control unit 150 determines whether an operation is received by the operation unit 110 (step S51). When the operation is not received (NO in step S51), the control unit 150 stands by until an operation is received.

When the control unit 150 determines that an operation of starting position detection is received by the operation unit 110 (YES in step S51), the control unit 150 causes the beacon reception unit 119 to receive the beacon signals (step S52).

The control unit 150 determines whether the beacon signals are received (step S53). Here, when the control unit 150 determines that the beacon signals are unreceivable (NO in step S53), the control unit 150 outputs a reception error (step S54) and ends the present process. A reception error is output specifically by displaying an image by the image display unit 20 and/or outputting a sound by the headset 30.

When the beacon signals are received (YES in step S53), the control unit 150 acquires information included as the variable value in the received beacon signals (step S55). Here, the control unit 150 may acquire the information along with the variable value in accordance with the beacon ID.

The control unit 150 compares the information acquired from the beacon signals to the reference of the currently set reception conditions (step S56).

Here, the reception conditions include the reception period, the duty ratio and the length of the reception duration at the reception period, and reception timings. In the HMD 100, the reception conditions can be selected and set among the plurality of reception conditions and each of the reception conditions is included in, for example, the setting data 123. A range of the detected value of the sensor 202 included in the beacon signals transmitted by the beacon device 201 is set in association with each reception condition.

For example, the beacon device 201 can transmit the beacon signals included in the measured value of a heart rate of the user and can associate the reception conditions of the control unit 150 with a range of the heart rate. In this example, a first reception condition corresponding to a case in which the heart rate is equal to or less than 120 times/minute, a second reception condition corresponding to a case in which the heart rate exceeds 120 times/minute and equal to or less than 140 times/minute, and a third reception condition corresponding to a case in which the heart rate exceeds 140 times/minute can be set. In the first, second, and third reception conditions, the length and/or duty ratio of the reception duration at the reception period, the length of the reception period, and the reception timing are different. The third reception condition is a condition in which a reception probability of the beacon signals transmitted by the beacon device 201 is the highest. In the second reception condition, the reception probability of the beacon signals is higher than in the first reception condition and lower than in the third reception condition.

In this example, when the heart rate of the user exceeds 120 times/minute, the reception condition is changed from the first reception condition to the second reception condition and the reception probability of the beacon signals can be raised. Further, when the heart rate of the user exceeds 140 times/minute, the reception condition is changed from the second reception condition to the third reception condition and the reception probability of the beacon signals can be further raised. Therefore, when the importance of the management of the heart rate by the beacon signals is increased to correspond to the heart rate of the user, it is possible to raise the reception probability of the beacon signals. In a state in which the heart rate of the user is low and the importance of management of the heart rate is low, the first reception condition in which the reception probability is lowered is set. The reception condition in which the reception probability is low has, for example, characteristics that the reception duration is short, the duty ratio is small, and the reception period is long. Thus, it is possible to suppress power consumption of the HMD 100. Accordingly, the system 1A can appropriately adjust the reception probability by changing the reception conditions to correspond to information regarding the body (organism) of the user. Thus, it is possible to prevent the power consumption.

The reception conditions of the system 1A can be set to correspond to the information detected by the sensor 202. For example, the number of reception conditions corresponding to the plurality of types of sensors 202 may be included in the setting data 123 to be stored. In this case, the HMD 100 and another type of beacon device 201 may be associated to be used. The HMD 100 can receive the beacon signals from the plurality of beacon devices 201 in which the types of sensors 202 are different and perform an operation.

The control unit 150 determines whether the information acquired in step S55 is suitable for the currently set reception conditions (step S57). When the information is not suitable for the reception condition (NO in step S57), the control unit 150 changes the reception condition (step S58).

When the information acquired in step S55 is suitable for the reception conditions during the setting (YES in step S57) and after the reception conditions are changed in step S58, the control unit 150 stores the acquired information in the storage unit 122 (step S59).

The control unit 150 determines whether an ending operation of ending the detection is received by the operation unit 110 (step S60). When the ending operation of ending the detection is not received (NO in step S60), the control unit 150 returns the process to step S52. Conversely, when the ending operation of ending the detection is received (YES in step S60), the control unit 150 ends the operation of FIG. 19.

When the starting operation is received by the operation unit 110, the start trigger of the flowchart illustrated in FIG. 19 has been described as a trigger, but the start trigger may be set in accordance with another method. For example, the fact that an application program is activated or the fact that the HMD 100 is powered on may be set as a start trigger.

The control unit 150 may perform an analysis process on the information stored in step S122 in step S59 and perform displaying an image and outputting a sound corresponding to the result of the analysis process. For example, the image display unit 20 may perform an operation of displaying a measured value of the sensor 202 or displaying a warning based on the measured value under the control of the control unit 150. At this time, a sound may be output.

When the beacon signals are received from the plurality of beacon devices 201, the control unit 150 may perform the operation of FIG. 19 for each beacon device 201. In this case, the control unit 150 may store the information acquired from the beacon signals in the storage unit 122 for each beacon device 201.

The beacon device 201 may be configured to include the plurality of sensors 202. In this case, the control unit 203 may include detected values of the plurality of sensors 202 in fields in which the variable values are stored in the beacon signals. The beacon signal may be generated and transmitted for each sensor 202.

In the system 1A, transmission operation conditions in which the beacon devices 201 transmit the beacon signals may be changed. The transmission operation conditions include, for example, a period at which the beacon device 201 transmits the beacon signal, the length of a transmission duration in which a radio signal is output at the transmission period, a duty ratio between the transmission duration and a non-transmission duration at the transmission period, and a transmission timing.

More specifically, an operation example (1) and an operation example (2) to be described below can be exemplified.

In the operation example (1), the control unit 203 changes the transmission operation conditions based on the detected values of the sensors 202.

The beacon device 201 stores the plurality of transmission operation conditions in advance in the memory 204 in association with a range of the detected values of the sensors 202. When the detected values of the sensors 202 are acquired, the control unit 203 determines whether the acquired detected values are within the range of the detected values corresponding to the transmission operation conditions during setting. When the acquired detected values are not in the range of the detected values corresponding to the transmission operation conditions during the setting, the transmission operation conditions are changed to transmission operation conditions corresponding to the acquired detected values.

In the operation example (2), the HMD 100 transmits a control signal for instructing the beacon device 201 to change the transmission operation conditions.

In this case, the HMD 100 stores the plurality of transmission operation conditions in advance in the setting data 123 in association with the information acquired from the beacon signals, that is, a condition of the information indicating the detected values of the sensors 202.

In the process of determining whether the information acquired from the beacon signals is suitable for the reception condition during the setting (step S57), the control unit 150 determines whether the acquired information is suitable for the transmission operation condition during the setting. When the acquired information is not suitable for the transmission operation condition during the setting, the control unit 150 acquires the transmission operation conditions corresponding to the acquired information. Further, a control signal for instructing the beacon device 201 to transmit the beacon signal under the acquired transmission operation conditions is transmitted to the beacon device 201 by the beacon reception unit 119 or the communication unit 117. Here, the communication unit 205 of the beacon device 201 is configured to be able to receive a control signal transmitted by the HMD 100 and change the transmission operation conditions in accordance with the received control signal.

In either the operation example (1) or (2), the condition that the beacon device 201 transmits the beacon signal can be changed or adjusted to correspond to the detected values of the sensors 202. Therefore, a transmission frequency of the beacon signals can be changed to correspond to the importance or the like by which the detected values of the sensors 202 are managed. For example, in a state in which the importance by which the detected values are managed is low, the transmission frequency of the beacon signals can be set to be low, thereby preventing power consumption of the beacon device 201. For example, when the importance by which the detected values of the sensors 202 are managed is high, for example, a process of raising the transmission frequency of the beacon signals can be performed.

In this way, in the system 1A according to the third embodiment, the control unit 150 changes the reception period of the beacon reception unit 119 based on information regarding the detected values of the sensors 202 acquired from the beacon signals received by the beacon reception unit 119. Therefore, the reception period of the beacon signals can be changed based on the information included in the beacon signals received by the beacon reception unit 119 or the information indicated by the beacon signals. Accordingly, it is possible to change the reception period of the beacon signals based on the content of the information regarding the detected values of the sensors 202 transmitted from the beacon devices 201. For example, it is possible to optimize the reception period to correspond to the importance of the information. Thus, it is possible to increase the probability that the beacon signals are captured based on the information regarding the detected values of the sensors 202 to receive the beacon signals more reliably.

For example, the control unit 150 sets the first duration in which the beacon reception unit 119 is caused to perform the operation of receiving the beacon signals and the second duration in which the beacon reception unit 119 is caused not to perform the operation of receiving the beacon signals. Then, the control unit 150 changes the duty ratio between the first and second durations, the length of the first duration, or the reception period of the beacon reception unit 119. Therefore, the reception operation of the beacon reception unit 119 can be adjusted based on the information regarding the detected values of the sensors 202. Accordingly, it is possible to increase the probability that the beacon signals are captured based on the information regarding the detected values of the sensors 202 and to receive the beacon signals more reliably.

The invention is not limited to the configurations of the foregoing embodiments, but can be embodied in various forms within the scope of the invention without departing from the gist of the invention.

For example, in the first and second embodiments, the beacon devices 200 shown in a captured image of the camera 61 may be selected to transmit the beacon signals used for the beacon positioning among the beacon signals received by the HMD 100. For example, an image indicating the beacon ID is attached to the beacon device 200 so that the beacon ID of the beacon device 200 can be recognized with a captured image of the camera 61. The control unit 150 recognizes the beacon ID of the beacon device 200 from a captured image of the camera 61 and adjusts the reception period so that the beacon signal of the same beacon ID as the recognized beacon ID can be received.

In the foregoing embodiments, the configuration in which the control device 10 is connected to the image display unit 20 in a wired manner has been exemplified, but the invention is not limited thereto. The image display unit 20 may be wirelessly connected to the control device 10. In this case, as a wireless communication scheme, a scheme exemplified as the communication scheme corresponding to the communication unit 117 may be adopted or another communication scheme may be adopted.

The image display unit 20 may have some of the functions of the control device 10 or the control device 10 may be realized in a plurality of devices. That is, the control device 10 is not limited to the configuration in which the box-shaped case 10A is included. For example, instead of the control device 10, a wearable device which can be worn on the body of a user, a cloth, or an accessory worn on the body of the user may be used. In this case, the wearable device may be, for example, a watch type device, a ring type device, a laser pointer, a mouse, an air mouse, a game controller, or a pen type device.

Further, in the foregoing embodiments, the configuration in which the image display unit 20 and the control device 10 are separated from each other has been described as an example, but the control device 10 and the image display unit 20 can also be configured to be integrated and worn on the head of a user.

As the control device 10, a notebook type computer, a tablet computer, or a desktop computer may be used. As the control device 10, a portable electronic device including a game device, a mobile phone, a smartphone, or a portable medium player or another dedicated device may be used.

In the foregoing embodiments, a configuration in which a user sees an outside scenery through a display unit is not limited to the configuration in which the right light-guiding plate 26 and the left light-guiding plate 28 transmit the outside light. For example, the invention can also be applied to a display device that displays an image in a state in which an outside scenery may not be seen. Specifically, the invention can be applied to a display device that displays a captured image of the camera 61, an image or a CG generated based on the captured image, a video based on video data stored in advance or video data input from the outside, or the like. Such type of display device can include a so-called close type display device with which an outside scenery may not be seen. The invention can be applied to a display device that does not perform a process such as AR display in which an image is displayed to be overlapped on an actual space, as described in the foregoing embodiments, or mixed reality (MR) display in which a captured image of the actual space and a virtual image are combined. The invention can also be applied to a display device that does not perform a process such as virtual reality (VR) display in which a virtual image is displayed. For example, a display device that displays video data input from the outside or an analog video signal can also be, of course, included in an application target of the invention.

For example, instead of the image display unit 20, for example, another type of image display unit such as an image display unit worn like a hat may be adopted. A display unit that displays an image for the left eye LE of the user and a display unit that displays an image for the right eye RE of the user may be included. The display device according to the invention may also be configured as a head-mounted display mounted on a vehicle such as an automobile or an airplane. For example, the display device may be configured as a head-mounted display built in a body protector such as a helmet. In this case, a portion positioning the position of the body of a user and a portion poisoning this portion may be configured as wearing portions.

As an optical system guiding image light to the eyes of a user, the configuration in which virtual images formed in parts of the right light-guiding plate 26 and the left light-guiding plate 28 by the half mirrors 261 and 281 has been exemplified. The invention is not limited thereto, but a configuration in which an image is displayed in a display region that has an area occupying the entire surfaces or most of the surfaces of the right light-guiding plate 26 and the left light-guiding plate 28 may be employed. In this case, an operation of changing a display position of an image may include a process of contracting the image.

Further, the optical elements according to the invention are not limited to the right light-guiding plate 26 and the left light-guiding plate 28 including the half mirrors 261 and 281, but may be optical components that cause image light to be incident on the eyes of a user. Specifically, a diffraction grating, a prism, or a hologram display unit may be used.

At least some of the functional blocks illustrated in FIGS. 6, 7, 18, and the like may be realized by hardware or may be realized by a combination of hardware and software. The invention is not limited to a configuration in which the independent hardware resources illustrated in the drawings are disposed. A program executed by the control unit 150 may be stored in the nonvolatile storage unit 121 or another storage device (not illustrated) in the control device 10. A configuration may also be realized in which a program stored in an external device may be acquired via the communication unit 117 or the external connector 184 to be executed. Of the constituents formed in the control device 10, the operation unit 110 may be formed as a user interface (UI).

The units of processes in the flowcharts illustrated in FIGS. 8, 16, and 19 are divided according to main processing content to facilitate understanding of the processes of the control unit 150 of the HMD 100. The invention is not limited by division methods or names of the units of processes. The processes of the control unit 150 can be divided in more units of processes and one unit of process can also be divided to include more processes in accordance with process content. The process procedures of the foregoing flowcharts are not limited to the illustrated examples either.

The entire disclosure of Japanese Patent Application No.: 2016-190611, filed Sep. 29, 2016 and 2017-106489, filed May 30, 2017 are expressly incorporated by reference herein.

What is claimed is:

1. A display device that is a transmissive display device worn on a head of a user and transmits an outside scenery so that the user views the outside scenery, the display device comprising:
a reception unit that simultaneously receives a plurality of beacon signals from a plurality of beacon devices; and
a control unit that controls a reception period of the reception unit, wherein
arriving ranges of the beacon signals transmitted by the beacon devices partially overlap each other so that the receiving unit intermittently receives the plurality of beacon signals,
the control unit changes the reception period of the reception unit to correspond to a reception state of the plurality of beacon signals received by the reception unit,
the control unit compares a reception strength of each of the received plurality of beacon signals to a threshold, and selects beacon signals, from the received plurality of beacon signals, the selected beacon signals having a reception strength that is greater than or equal to the threshold,
when the number of the selected beacon signals having a reception strength that is greater than or equal to the threshold is 3, the control unit estimates the position of the display device through 3-point positioning,
when the number of the selected beacon signals having a reception strength that is greater than or equal to the threshold is 4 or more, the control unit estimates the position of the display device through 4-point positioning, and
when the number of the selected beacon signals having a reception strength that is greater than or equal to the threshold is less than 3, the control unit resets the reception period.

2. The display device according to claim 1,
wherein the control unit changes the reception period of the reception unit in accordance with a transmission timing of the selected beacon signals.

3. The display device according to claim 1,
wherein the control unit changes the reception period of the reception unit based on information included in each of the plurality of beacon signals received by the reception unit or information indicated by each of the plurality of beacon signals received by the reception unit.

4. A reception device comprising:
a reception unit that simultaneously receives a plurality of beacon signals from a plurality of beacon devices; and
a control unit that controls a reception period of the reception unit, wherein
arriving ranges of the beacon signals transmitted by the beacon devices partially overlap each other so that the receiving unit intermittently receives the plurality of beacon signals,
the control unit changes the reception period of the reception unit to correspond to a reception state of the plurality of beacon signals received by the reception unit,
the control unit compares a reception strength of each of the received plurality of beacon signals to a threshold, and selects beacon signals, from the received plurality of beacon signals, the selected beacon signals having a reception strength that is greater than or equal to the threshold,
when the number of the selected beacon signals having a reception strength that is greater than or equal to the threshold is 3, the control unit estimates the position of the reception unit through 3-point positioning,
when the number of the selected beacon signals having a reception strength that is greater than or equal to the threshold is 4 or more, the control unit estimates the position of the reception unit through 4-point positioning, and
when the number of the selected beacon signals having a reception strength that is greater than or equal to the threshold is less than 3, the control unit resets the reception period.

5. The reception device according to claim 4,
wherein the control unit changes the reception period of the reception unit in accordance with a transmission timing of the selected beacon signals.

6. The reception device according to claim 5,
wherein the control unit shifts the reception period of the reception unit in accordance with the transmission timing of the selected beacon signals.

7. The reception device according to claim 5,
wherein the control unit sets a first duration in which the reception unit is caused to perform an operation of receiving the plurality of beacon signals and a second duration in which the reception unit is caused not to perform the operation of receiving the plurality of beacon signals, and
wherein the control unit changes a duty ratio between the first and second durations at the reception period in accordance with the transmission timing of the selected beacon signals.

8. The reception device according to claim 5,
wherein the control unit sets a first duration in which the reception unit is caused to perform an operation of receiving the plurality of beacon signals and a second duration in which the reception unit is caused not to perform the operation of receiving the plurality of beacon signals, and
wherein the control unit changes a length of the first duration in accordance with the transmission timing of the selected beacon signals.

9. The reception device according to claim 5,
wherein when the reception unit receives the plurality of beacon signals, the control unit selects a preset number of beacon signals based on reception strengths of the received plurality of beacon signals and changes the reception period of the reception unit in accordance with the transmission timing of the selected beacon signals.

10. The reception device according to claim 9,
wherein the control unit acquires, from the plurality of beacon signals, information regarding transmission sources of the plurality of beacon signals and selects a preset number of beacon signals based on reception strengths of the received plurality of beacon signals and the information regarding the transmission sources of the plurality of beacon signals.

11. The reception device according to claim 9, wherein when the selected beacon signals include a beacon signal that is not receivable at the changed reception period, the control unit selects the beacon signal that is not receivable to be excluded from the selected beacon signals based on the reception strengths and resets the reception period in accordance with the transmission timings of the selected beacon signals from which the beacon signal to be excluded is excluded.

12. The reception device according to claim 4, wherein the control unit estimates a position of the reception device based on reception strengths of the plurality of beacon signal received by the reception unit.

13. The reception device according to claim 12, further comprising:
a storage unit that stores positional information indicating a position of each of a plurality of beacon devices, each beacon device transmitting a respective beacon signal in association with identification information of the beacon device,
wherein the control unit acquires the identification information from each of the plurality of beacon signals received by the reception unit and estimates the position of the reception device based on the reception strengths of the plurality of beacon signals and the pieces of positional information regarding the beacon devices, which are the transmission sources of the plurality of beacon signals, which are acquired from the storage unit.

14. The reception device according to claim 12, further comprising:
at least one of an acceleration sensor, a gyro sensor, and a magnetic sensor,
wherein the control unit corrects the estimated position of the reception device based on a sensor value detected by at least the one of the acceleration sensor, the gyro sensor, and the magnetic sensor.

15. The reception device according to claim 4, wherein the control unit changes the reception period of the reception unit based on information included in each of the plurality of beacon signals received by the reception unit or information indicated by each of the plurality of beacon signals received by the reception unit.

16. The reception device according to claim 15, wherein when a first duration in which the reception unit is caused to perform an operation of receiving the plurality of beacon signals and a second duration in which the reception unit is caused not to perform the operation of receiving the plurality of beacon signals are set, the control unit changes a duty ratio between the first and second durations, a length of the first duration, or the reception period of the reception unit.

17. The reception device according to claim 16, wherein based on information included in the plurality of beacon signals received by the reception unit or information indicated by the plurality of beacon signals received by the reception unit, the control unit changes the duty ratio between the first and second durations, the length of the first duration, or the reception period of the reception unit so that beacon signals other than the plurality of beacon signals received by the reception unit are received.

18. A method of controlling a reception device that controls a reception period of a reception unit, the method comprising:
simultaneously receiving, by the reception unit, a plurality of beacon signals from a plurality of beacon devices;
controlling a reception period of the reception unit, wherein
arriving ranges of the beacon signals transmitted by the beacon devices partially overlap each other so that the receiving unit intermittently receives the plurality of beacon signals;
changing the reception period of the reception unit to correspond to a reception state of the plurality of beacon signals received by the reception unit;
comparing a reception strength of each of the received plurality of beacon signals to a threshold, and selecting beacon signals, from the received plurality of beacon signals, the selected beacon signals having a reception strength that is greater than or equal to the threshold;
when the number of the selected beacon signals having a reception strength that is greater than or equal to the threshold is 3, estimating the position of the reception unit through 3-point positioning;
when the number of the selected beacon signals having a reception strength that is greater than or equal to the threshold is 4 or more, estimating the position of the reception unit through 4-point positioning; and
when the number of the selected beacon signals having a reception strength that is greater than or equal to the threshold is less than 3, resetting the reception period.

19. The method of controlling the reception device according to claim 18, the method further comprising:
detecting a reception strength as the reception state of the plurality of beacon signals received by the reception unit; and
changing the reception period of the reception unit in accordance with a transmission timing of the selected beacon signals.

* * * * *